US011368410B2

(12) United States Patent
Parker et al.

(10) Patent No.: US 11,368,410 B2
(45) Date of Patent: Jun. 21, 2022

(54) SYSTEM AND METHOD FOR SCALING ANALYTICS COLLECTION

(71) Applicant: Mojatatu Networks, Ottawa (CA)

(72) Inventors: Michael Parker, Ottawa (CA); Jamal Hadi Salim, Ottawa (CA)

(73) Assignee: MOJATATU NETWORKS, Ottawa (CA)

( * ) Notice: Subject to any disclaimer, the term of this patent is extended or adjusted under 35 U.S.C. 154(b) by 0 days.

(21) Appl. No.: 16/820,561

(22) Filed: Mar. 16, 2020

(65) Prior Publication Data
US 2020/0296055 A1 Sep. 17, 2020

Related U.S. Application Data

(60) Provisional application No. 62/818,943, filed on Mar. 15, 2019.

(51) Int. Cl.
| | |
|---|---|
| *H04L 12/911* | (2013.01) |
| *H04L 47/70* | (2022.01) |
| *H04L 47/783* | (2022.01) |
| *H04L 47/80* | (2022.01) |
| *H04L 47/762* | (2022.01) |

(52) U.S. Cl.
CPC .......... *H04L 47/822* (2013.01); *H04L 47/762* (2013.01); *H04L 47/783* (2013.01); *H04L 47/801* (2013.01); *H04L 47/827* (2013.01)

(58) Field of Classification Search
CPC ... H04L 47/822; H04L 47/783; H04L 47/801; H04L 47/762; H04L 47/827; H04L 67/32; G06F 21/554; H04Q 9/00
See application file for complete search history.

(56) References Cited

U.S. PATENT DOCUMENTS

| | | | | |
|---|---|---|---|---|
| 6,885,309 | B1* | 4/2005 | Van Heteren .......... | G08C 15/06 340/540 |
| 10,310,760 | B1* | 6/2019 | Dreier ................. | G06F 16/1827 |
| 2002/0030604 | A1* | 3/2002 | Chance ................... | H04Q 9/00 340/870.09 |
| 2004/0064437 | A1* | 4/2004 | Knopf ..................... | G06F 16/21 |
| 2006/0028987 | A1* | 2/2006 | Alexander Gildfind ..................... H04L 47/24 370/232 |
| 2012/0245715 | A1* | 9/2012 | Short ...................... | A63F 13/77 700/91 |
| 2014/0006347 | A1* | 1/2014 | Qureshi ................ | H04W 4/029 707/621 |

(Continued)

OTHER PUBLICATIONS

Network Programmability With ForCES Evangelos Haleplidis;Jamal Hadi Salim;Joel M. Halpern;Susan Hares;Kostas Pentikousis;Kentaro Ogawa;Weiming Wang;Spyros Denazis;Odysseas Koufopavlou IEEE Communications Surveys & Tutorials Year: 2015 | vol. 17, Issue: 3 | Journal Article | Publisher: IEEE (Year: 2015).*

*Primary Examiner* — Michael Won
(74) *Attorney, Agent, or Firm* — Jonathan Kidney; Intelink Law Group, P.C.

(57) ABSTRACT

A system for analytics collection from distributed resource in a software-defined networking. The system comprises: an analytics engine; and a resource interface communicated with the analytics engine, the resource interface being configured to collect telemetry data from the resource and to transmit the telemetry data to the analytics engine.

21 Claims, 17 Drawing Sheets

(56) References Cited

U.S. PATENT DOCUMENTS

| | | | |
|---|---|---|---|
| 2014/0245345 A1* | 8/2014 | Streeter | H04H 20/103 725/32 |
| 2014/0247140 A1* | 9/2014 | Proud | H02J 50/80 340/870.02 |
| 2014/0266781 A1* | 9/2014 | Ottaway | H04Q 9/00 340/870.02 |
| 2016/0092697 A1* | 3/2016 | Nayshtut | H04W 4/21 726/26 |
| 2017/0005515 A1* | 1/2017 | Sanders | H02J 3/32 |
| 2017/0006135 A1* | 1/2017 | Siebel | H04L 69/40 |
| 2017/0264493 A1* | 9/2017 | Cencini | H04L 67/1008 |
| 2017/0337227 A1* | 11/2017 | Abraham | G06T 11/206 |
| 2017/0364561 A1* | 12/2017 | Wu | G06F 16/24578 |
| 2018/0219749 A1* | 8/2018 | Bugenhagen | H04L 41/14 |
| 2018/0262454 A1* | 9/2018 | Zandi | H04L 41/0893 |
| 2018/0262533 A1* | 9/2018 | McCaig | H04L 63/1408 |
| 2018/0367414 A1* | 12/2018 | Raghavendra | H04L 43/0817 |
| 2019/0199602 A1* | 6/2019 | Zhang | H04L 41/16 |
| 2019/0320340 A1* | 10/2019 | Alam | H04W 28/0284 |
| 2020/0074084 A1* | 3/2020 | Dorrans | G06F 21/6245 |
| 2020/0136943 A1* | 4/2020 | Ban | H04L 43/08 |
| 2020/0244695 A1* | 7/2020 | Veselov | H04L 63/1416 |
| 2020/0313957 A1* | 10/2020 | A | H04L 41/082 |
| 2020/0371857 A1* | 11/2020 | Guha | G06F 9/5072 |
| 2021/0021480 A1* | 1/2021 | Puttur | H04L 41/0654 |
| 2021/0144517 A1* | 5/2021 | Guim Bernat | G06F 11/3006 |

* cited by examiner

SYSTEM AND METHOD FOR SCALING ANALYTICS COLLECTION

CROSS-REFERENCE TO RELATED APPLICATIONS

This application claims priority to U.S. provisional patent application No. 62/818,943, filed Mar. 15, 2019, which is incorporated herein by reference.

FIELD

The present application relates generally to analytics collection, in particular to systems and methods for scaling analytics collection.

BACKGROUND

The industry momentum to move towards automation of network resource management has energized the field of network telemetry. Scaling analytics collection is therefore becoming a prominent issue.

In most cases the consumer of the analytics data tends to be a bottleneck when processing analytics data. A consumer could be overwhelmed by the events generated by the resources depending on the amount of processing they perform on the data as well as the rate of analytics data received. The overall effect is events being lost as Input/Output (IO) from the resources towards the consumers gets overwhelmed, due to consumer processing capacity being over subscribed.

SUMMARY

In an aspect, there is provided a system for analytics collection from distributed resource in a software-defined networking, comprising: an analytics engine; and a resource interface communicated with the analytics engine, the resource interface being configured to collect telemetry data from the resource.

In another aspect, there is provided a method to select a CE application to process an event, comprising: selecting an application from a group list of subscribed applications; if the application is overloaded, select a next application from the group list; if the application is not overloaded, sending the event to the application.

BRIEF DESCRIPTION OF THE DRAWINGS

Reference will now be made, by way of example, to the accompanying drawings which show example embodiments of the present application, and in which:

FIG. 6B is a diagram illustrating an exemplary structure of the system in

FIG. 6A;

Similar reference numerals may have been used in different figures to denote similar components.

DETAILED DESCRIPTION OF EXAMPLE EMBODIMENTS

Collection of the data required for analytics involves two mechanisms: A poll mode where an analytics consumer initiates data collection on a set schedule or at predetermined intervals; and a push mode where the resources report notable events or statistics, triggered by preset thresholds, actions, or events.

Figure 1:
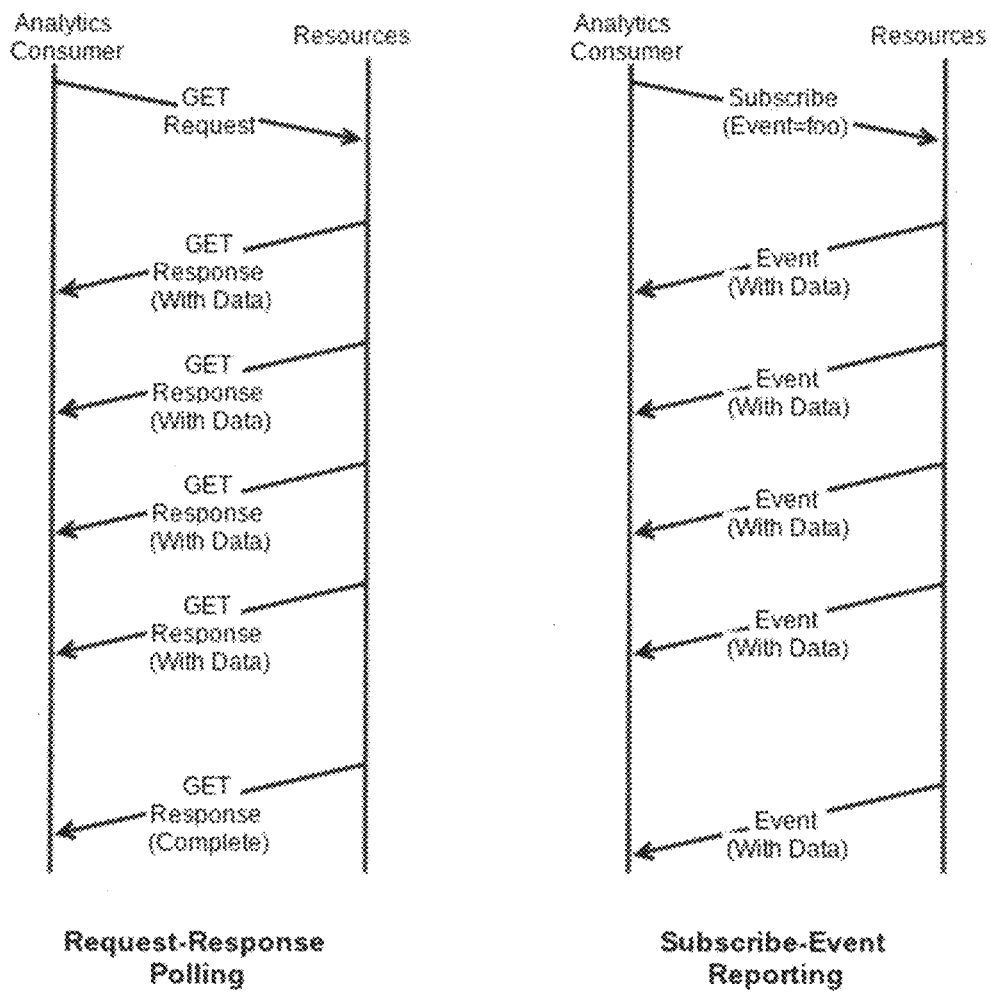
FIG. 1 illustrates steps of a poll mode and a push mode for acquiring analytics.

FIG. 1 shows the two mechanisms in action. In a poll mode or a Request-Response poll approach, the consumer driven by either a schedule or an event creates a GET transaction targeting a resource. The resource responds by sending one or a batch of back-to-back messages containing the requested data. The transaction is completed when the last message honoring the transaction is sent by the resource and received by the consumer. As illustrated in FIG. 1, in a push mode, which is also commonly referred to as publish-subscribe, the consumer issues a subscribe request to the resource. The resource will publish or report events when the subscribed-to events are triggered. Unlike the poll approach, push data is streamed by the resource towards the consumer asynchronously for as long as the consumer is subscribed to the event, and the consumer may subscribe to the event for a long time. The consumer can opt to unsubscribe at any time to end the transaction.

A push transaction may be considered as a long poll given the semantics are very similar, i.e, there is an initial message which activates the poll or push, followed by a series of messages and terminated by some activity. For example, in case of poll, the messages may be terminated by end of dump, and in the case of push, the messages may be terminated by unsubscription from the consumer. For this reason, the issues regarding the events in the push mechanism also apply to the poll approach.

To scale to a very large number of events from many sources requires an architecture that can efficiently process growing scale event messages. An example is to add a loadbalancing demultiplexing point between message consumers and producers or resources. The role of the load balancing point is to partition IO and collection processing into granular units.

Figure 2A:
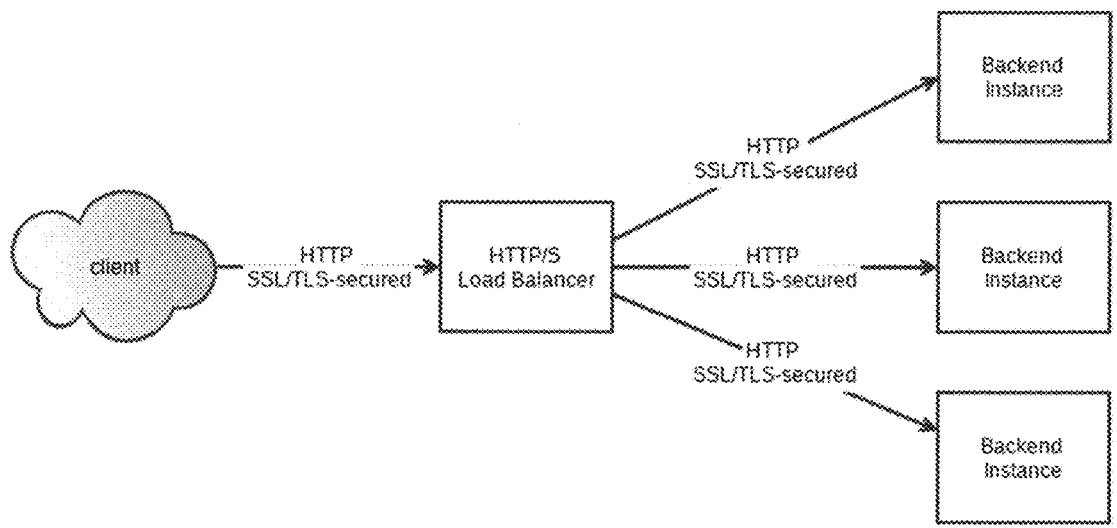
FIG. 2A-2H illustrates exemplary systems for analytics collection.

FIG. 2A illustrates an example to scale customers web based services. In FIG. 2A, a plurality of clients connecting to a customer service, for example via SSL/TLS secured links, are load balanced via a NGINX HTTP load balancer to a plurality of backend instances which are servers at the backend. As the demand for the customer service grows, more backend servers may be instantiated and load-balanced to.

A Software Defined Networking (SDN) solution performing analytics collection and processing may use a similar load distribution mechanism for scaling purposes. For example, the client in FIG. 2A may be resources and the backends may be the consumers of analytics.

At the lowest level of the hierarchy of a distributed eventing system is the resource. A resource generates the events which are consumed by a sensor application. The event consumer application is responsible for interfacing to the resource and subscribing for these events.

Figure 2B:
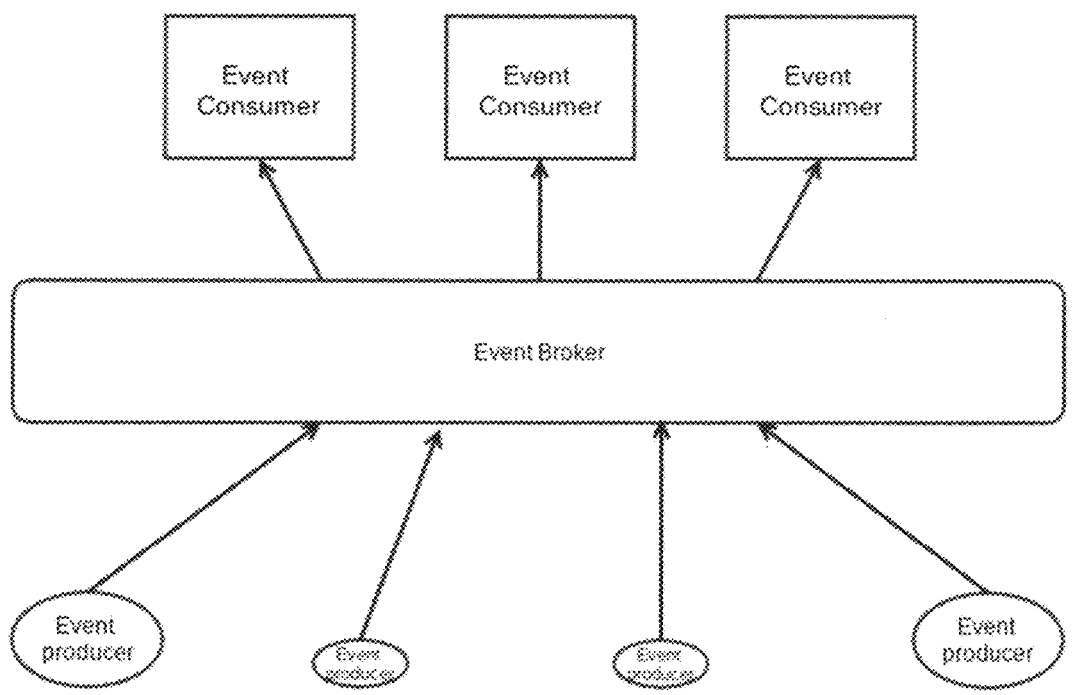

FIG. 2B shows an example of a setup of multiple resources event producers multiplexed to multiple consumers. In FIG. 2B, one or more event consumers may connect to an abstraction interface, such as an event broker, and receive events generated at the resource levels by one or more event producers. Given the plurality of the consumers, the event broker, or the abstraction interface, between the event producer and consumer may also be viewed as a bus which functions a broadcast domain for the event producers. The Event producers may broadcast events on the bus and the consumers listen for events of interest on the bus.

Figure 2C:
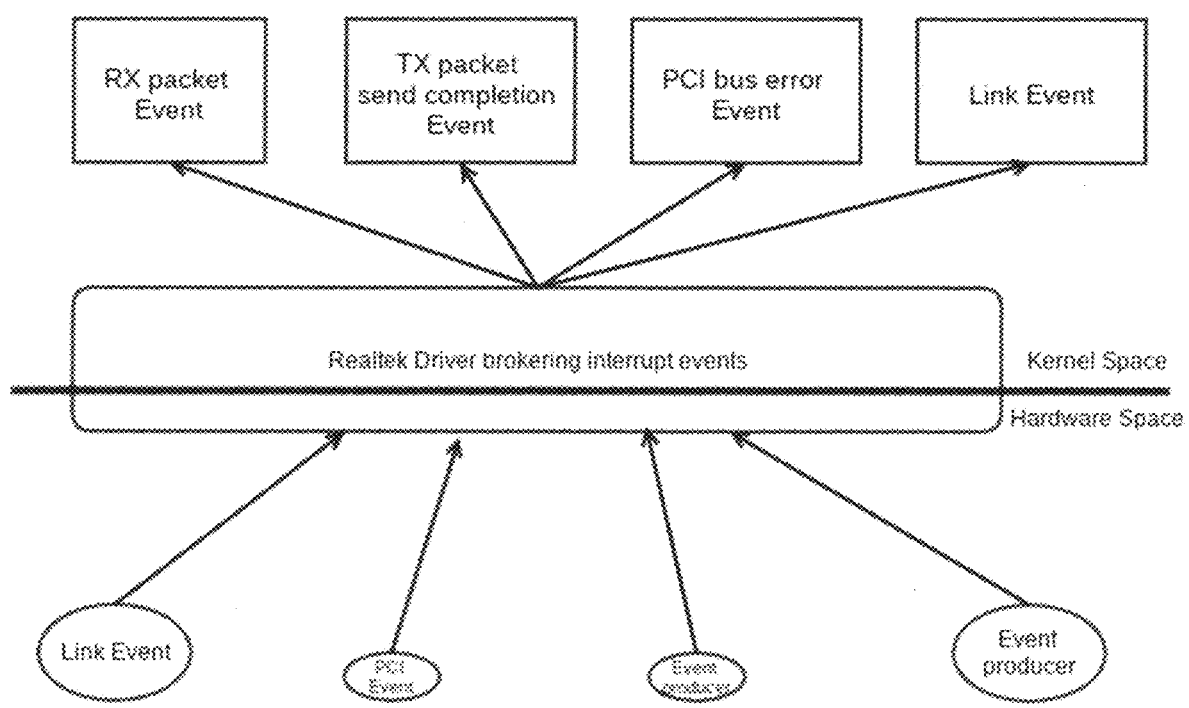

FIG. 2C is an example of a basic Ethernet driver for a Network Interface Card (NIC) in which multiple resources event producers are brokered to multiple consumers.

In the example of FIG. 2C, the events are interrupts. The types of events emitted by the hardware resource to the consumer may include a link change event, such as a cable plugged in or out from the ethernet port), a PCI event such as an error on the PCI bus that the NIC card experiences, a packet received from the network, a notification that a packet was successfully transmitted, etc. When the events occur at the hardware resource of the NIC, the NIC may report these events, for example to the Interrupt Status Register by using interrupts as notifications.

The Ethernet driver may subscribe to these events by writing to the Interrupt control register (ICR). When a subscribed-to event occurs, the driver reads the Interrupt Status Register (ISR) to determine type of the event, and may then proceed to invoke the appropriate code that consumes the event, for example, the code of link event handler.

Figure 2D:
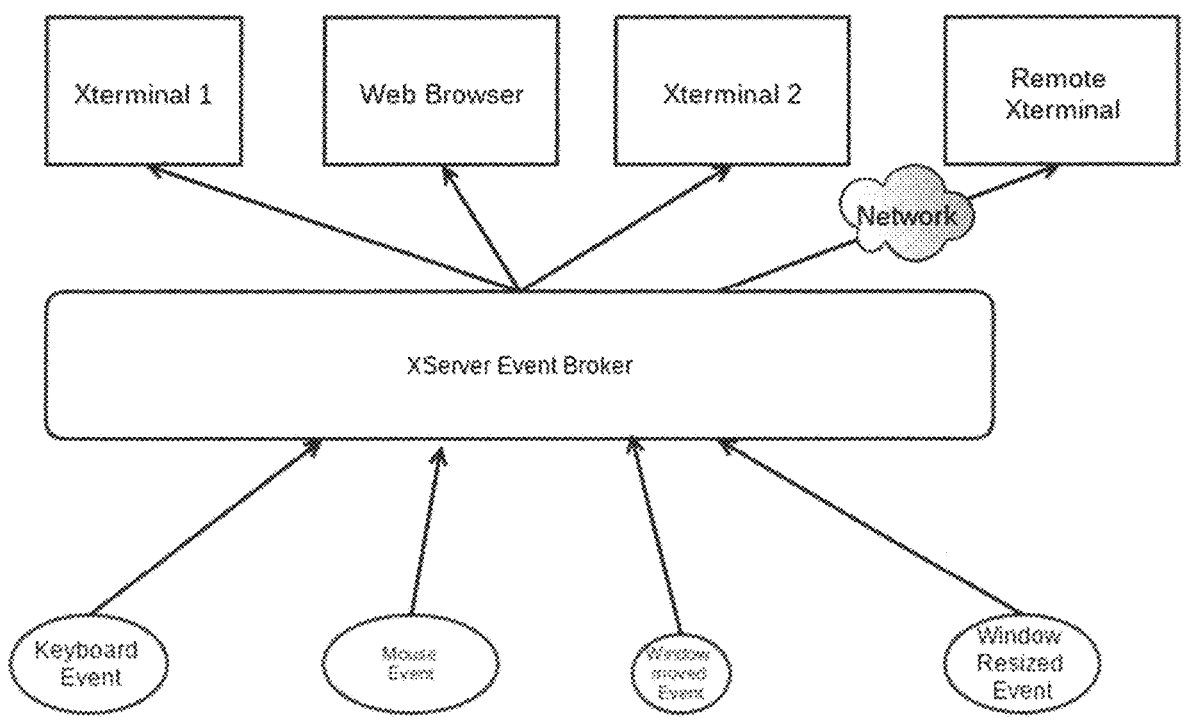

FIG. 2D illustrates an example of an X-windows system event management system. The X-server may act as an event broker. On the north of the X-server are applications such as web browsers, Xterminal windows, or remote Xterminal windows that may connect to the X-server via a network. The applications, also known as "clients" in X-windows, may subscribe to desired events, which are produced by the sensors of the X-windows system on the south of the X-server. The sensors may detect the activities of the resource activity, such as keyboard, the mouse, movement of the windows, or size changes of the window. The events may include a mouse button press or release, a keyboard press or release, a window being resized or moved, or any other activities of the components of the X-windows system.

When an event occurs at a resource, the X-server may be notified of events as the event occurs and the X-server may in turn broker the event by notifying all clients that have subscribed to such an event.

Figure 2E:
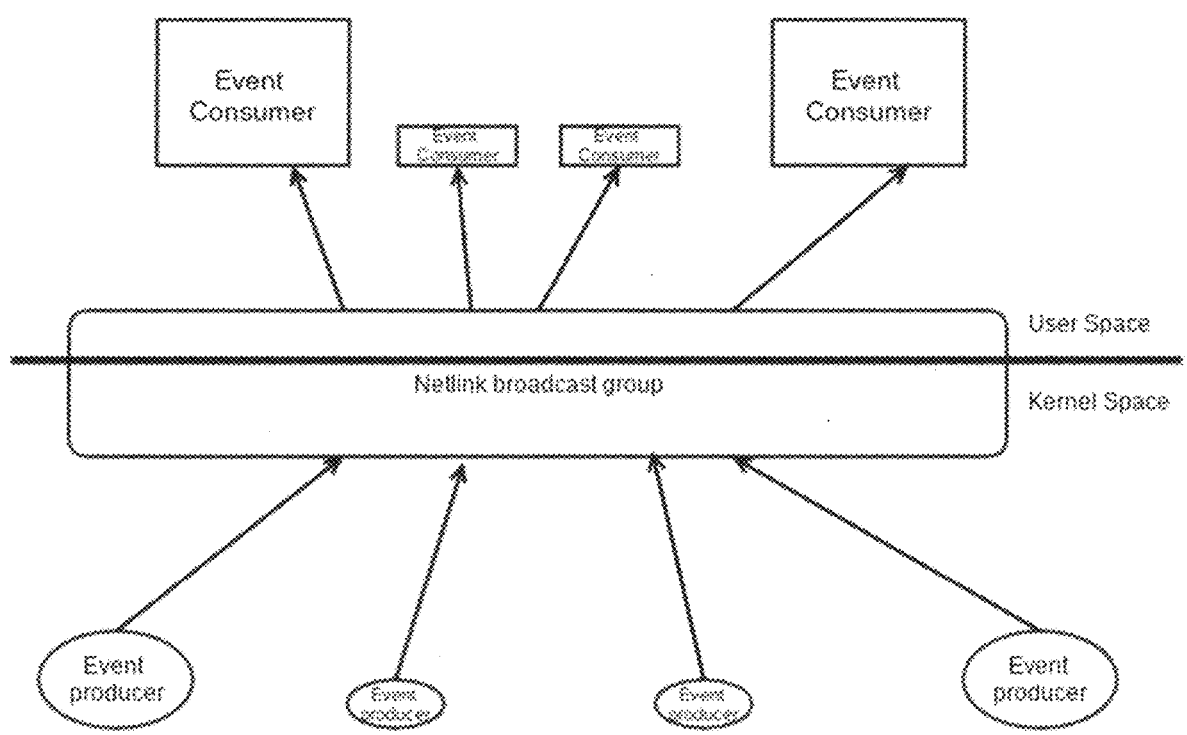

FIG. 2E shows another example where a consumer application in the user space side subscribes to events of choice by subscribing to a Linux netlink broadcast group on which the events generated by the event producers in the kernel space are broadcast. A netlink broadcast group may be considered as a "broadcast bus". Each broadcast bus will see multiple types of events from multiple sources. In the example of the Linux kernel for netlink events, a consumer application connected to the netlink RTNLGRP_TC broadcast bus sees events produced by Linux TC classifiers, chains, qdiscs, classes and actions. For each of those producers, the netlink RTNLGRP_TC broadcast bus sees events for object creation, deletion and updates. There are many types of classifiers, qdiscs and actions. However, a single application may become overwhelmed with event processing. This results in IO congestion and in this case, the linux kernel will drop events when the application does not pick them in a timely fashion.

Figure 2F:
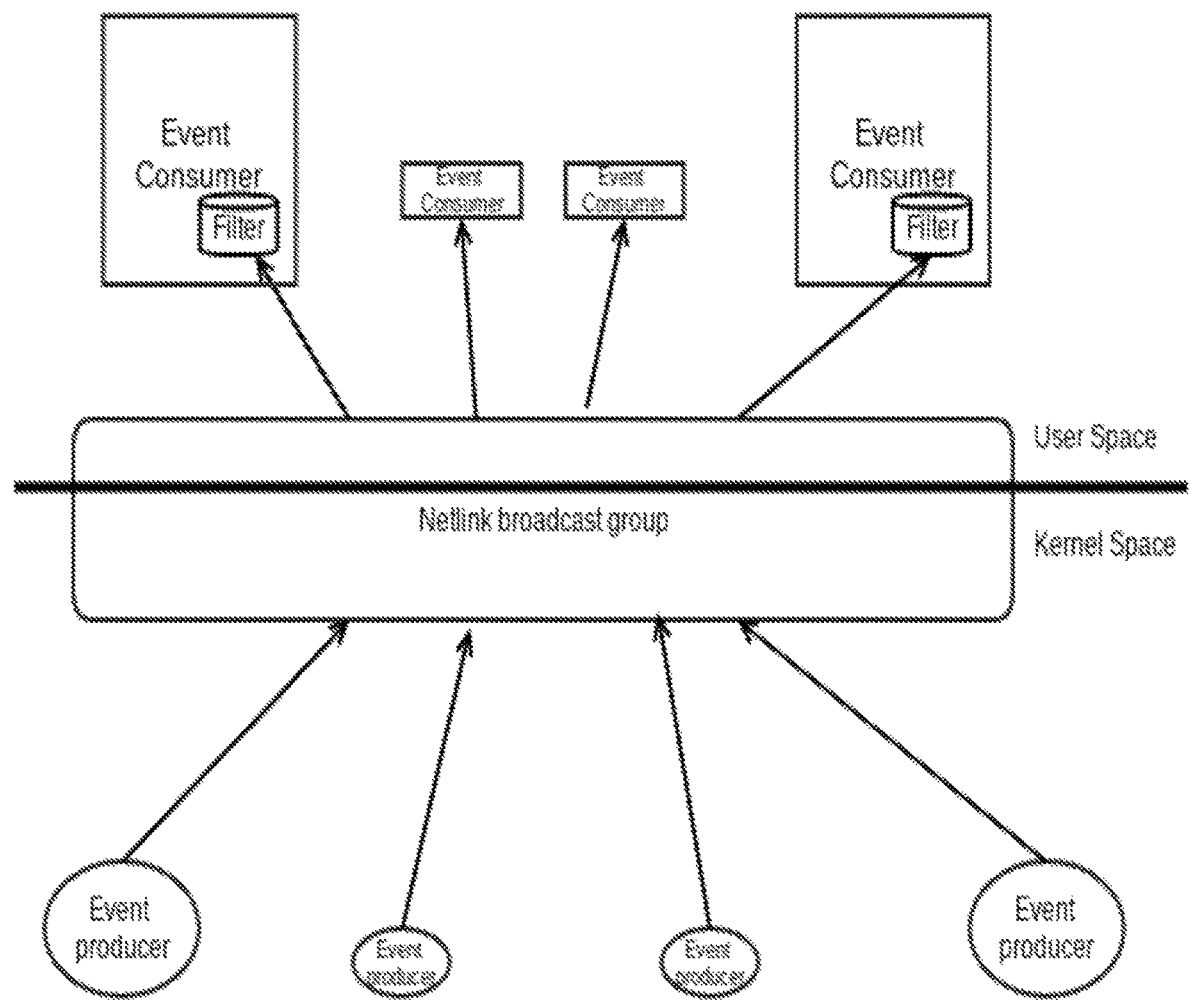

FIG. 2F illustrates another setup for event subscribing. In FIG. 2F, multiple event consumer instances are created; each consumer instance is responsible for a subset of the broadcast events. Each application instance carries a whitelist of events that are of interest. Whitelist may be filters located at the event consumers. Events outside the whitelist filter that are sent to the application are dropped at the filters. This approach allows the application to focus the majority of its processing cycles on wanted events. However, if the undesired events arrive at a high enough frequency, the application may still be overwhelmed in the filter processing. For example, cycles are spent to inspect the arriving undesired event just so as to drop them. This misuse of cycles could result in loss of desired events, for example when the kernel drops them because the processing capacity of the application is not sufficient to handle the received events.

Figure 2G:
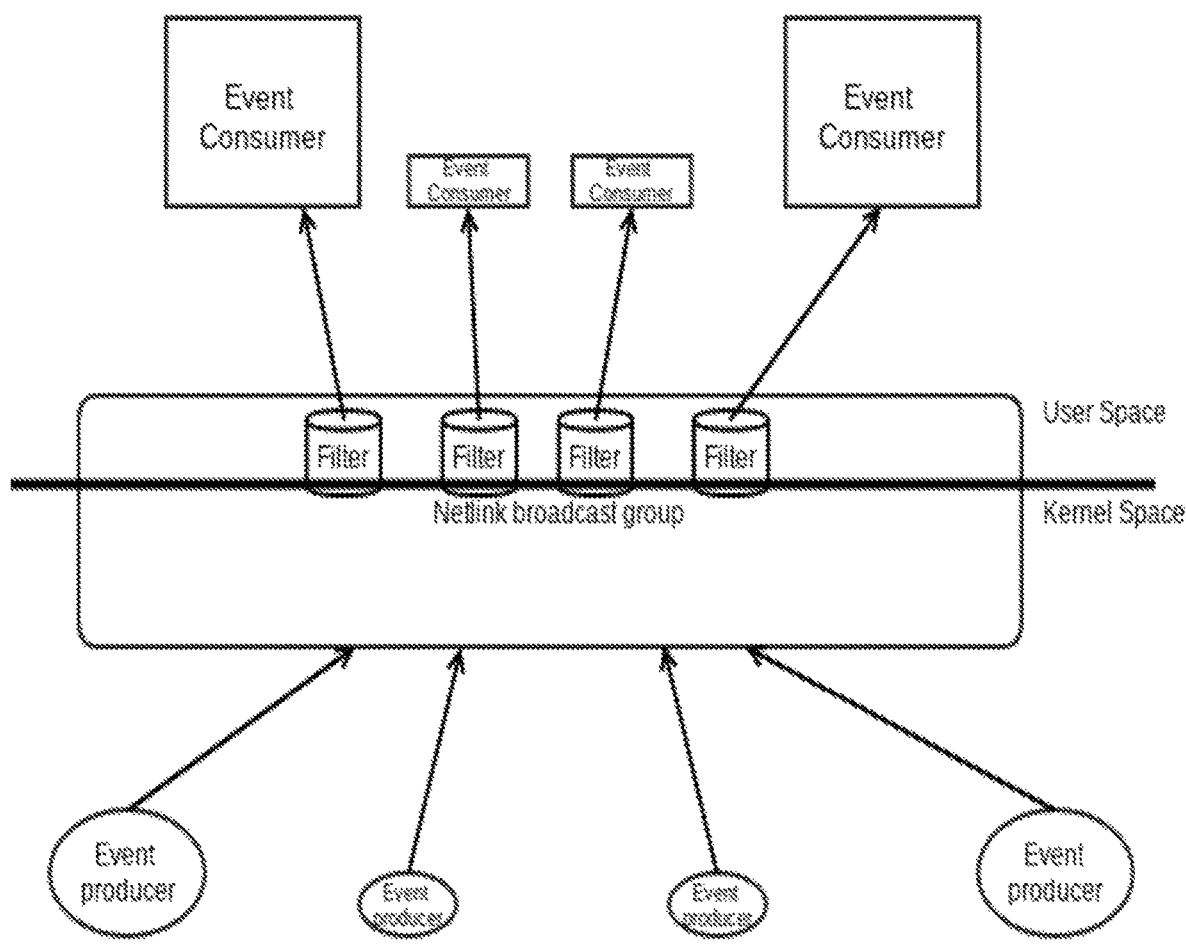

FIG. 2G illustrates another setup for event subscribing. In this example, the filters are being moved into netlink broadcast group at the Linux kernel. In FIG. 2E, unwanted events are filtered out at the Linux kernel. Therefore, the application at the event consumers only handles subscribed events. In some examples, socket filters provided by Linux utilize Berkeley Packet Filter (BPF) to inspect messages may be used to filter the events. Socket filters may either accept or reject the events before the events arrive at the user application. BPF inspects packet-formatted messages at given offsets to make its decisions. For whitelist filters, BPF may be used to specify where to look at in the data packet and what to match with in order to accept the packet. For blacklist filters, BPF may be used to specify where to look in the packet in order to reject the packet.

For filtering at the granularity of event types, BPF is not complex to describe event types at packet offsets. For example, a whitelist filter accepts only TC filter creation events or a blacklist for scheduler/qdisc change events etc since such signatures appear at known fixed offsets. However, for more fine-grained event filtering for example involving variable, often optional, packet data BPF assembler and the packet-format messaging vastly reduces usability of BPF. Netlink messages tend to be hierarchical with optionally appearing data; analyzing deeper into the headers using BPF increases complexity. As well, a kernel resource responding to a GET request may end up producing multiple netlink messages in a batch towards the user application. In this case, a BPF filter which requires to drop or accept a subset of the packetized netlink messages becomes impossible to craft. Any such activity would require interaction with the kernel memory management subsystem and maintenance of state across multiple messages; both approaches are complex and error-prone to implement in BPF.

Figure 2H:
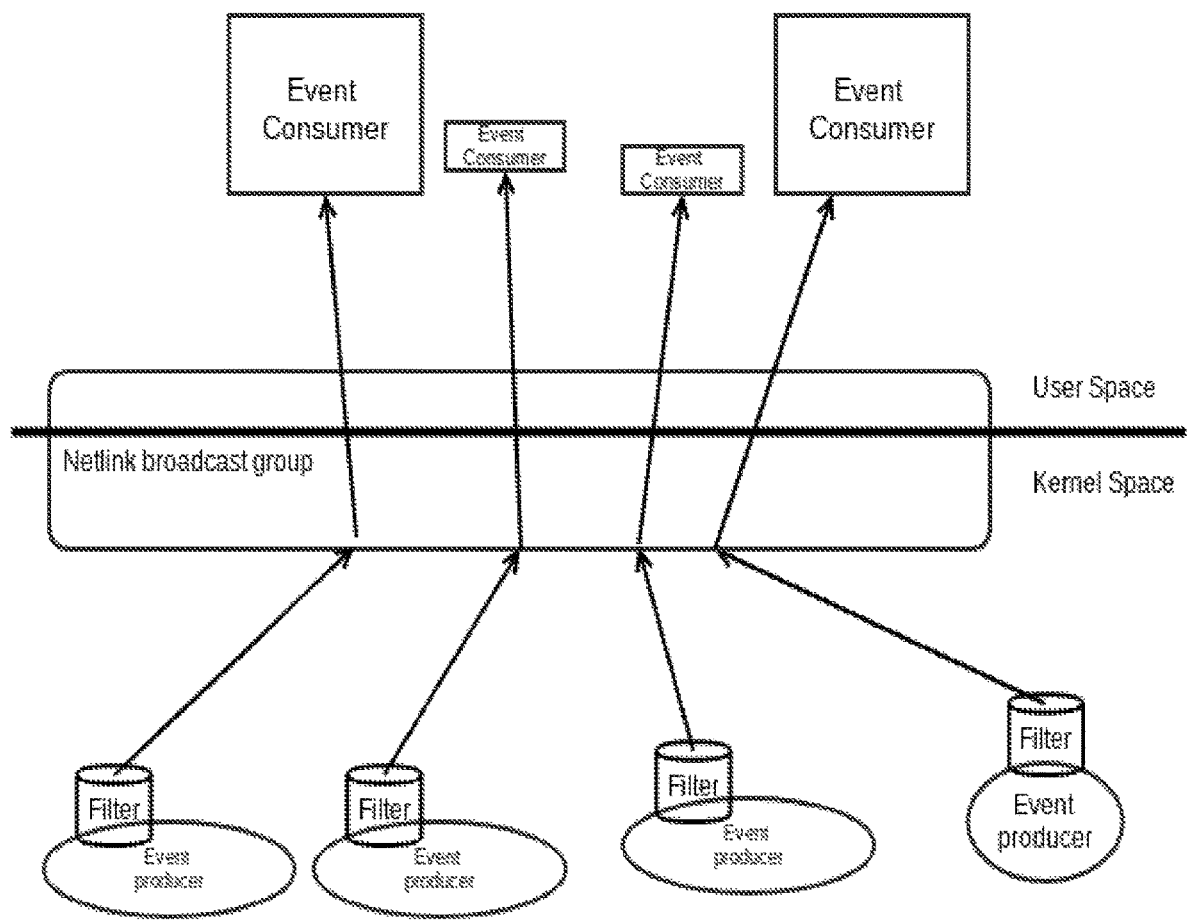

FIG. 2H illustrates another setup for event subscribing. In FIG. 2H, the filters are located at the event producers. This arrangement avoids the complexity of hierarchical message handling since the messages have not been packetized yet at the event producer, avoids having to deal with batched message state complexity since the packet batch has not been created yet at the event producer. With the setup in FIG.

2H, finer-grained filtering is possible since only raw data structures are processed at this stage.

In Linux, in some netlink resource GET queries, it is possible to describe what needs to be filtered within the request headers issued to the kernel similar to the description of FIG. 2H. For example, one could request FIB entries by providing filters for table identifiers etc. However, for every additional filter rule attribute, new netlink header (or TLVs) will need to be defined—implying modified versions of the application that understand any new attribute. In addition, the kernel code would need to be changed to deal with the new filter attributes. As well, at the moment Linux does not handle filtering at the event generation moment (before netlink messages are created); so more work is needed.

Figure 3A:
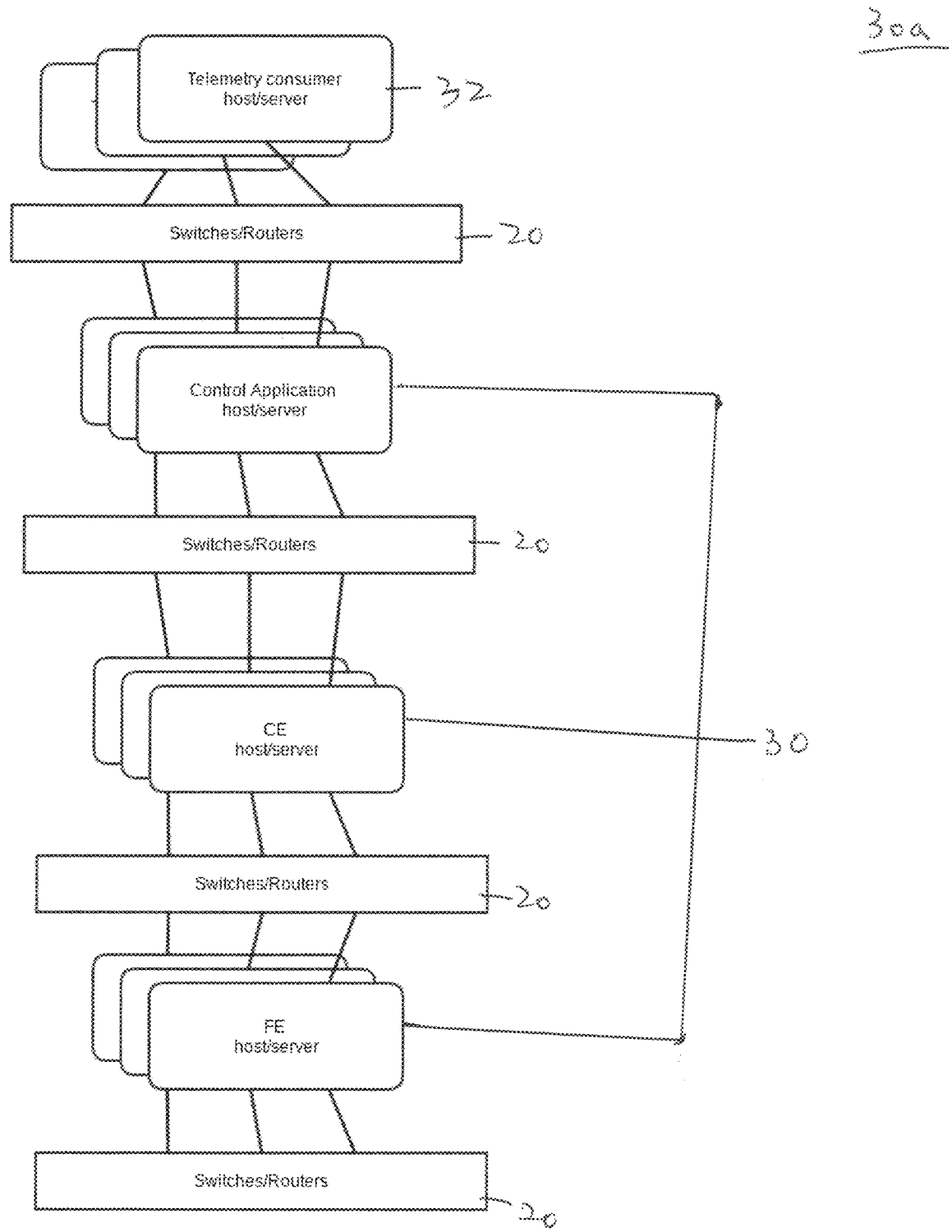
FIG. 3A is a block diagram illustrating a system for analytics collection, according to an embodiment of the present disclosure
Figure 3B:
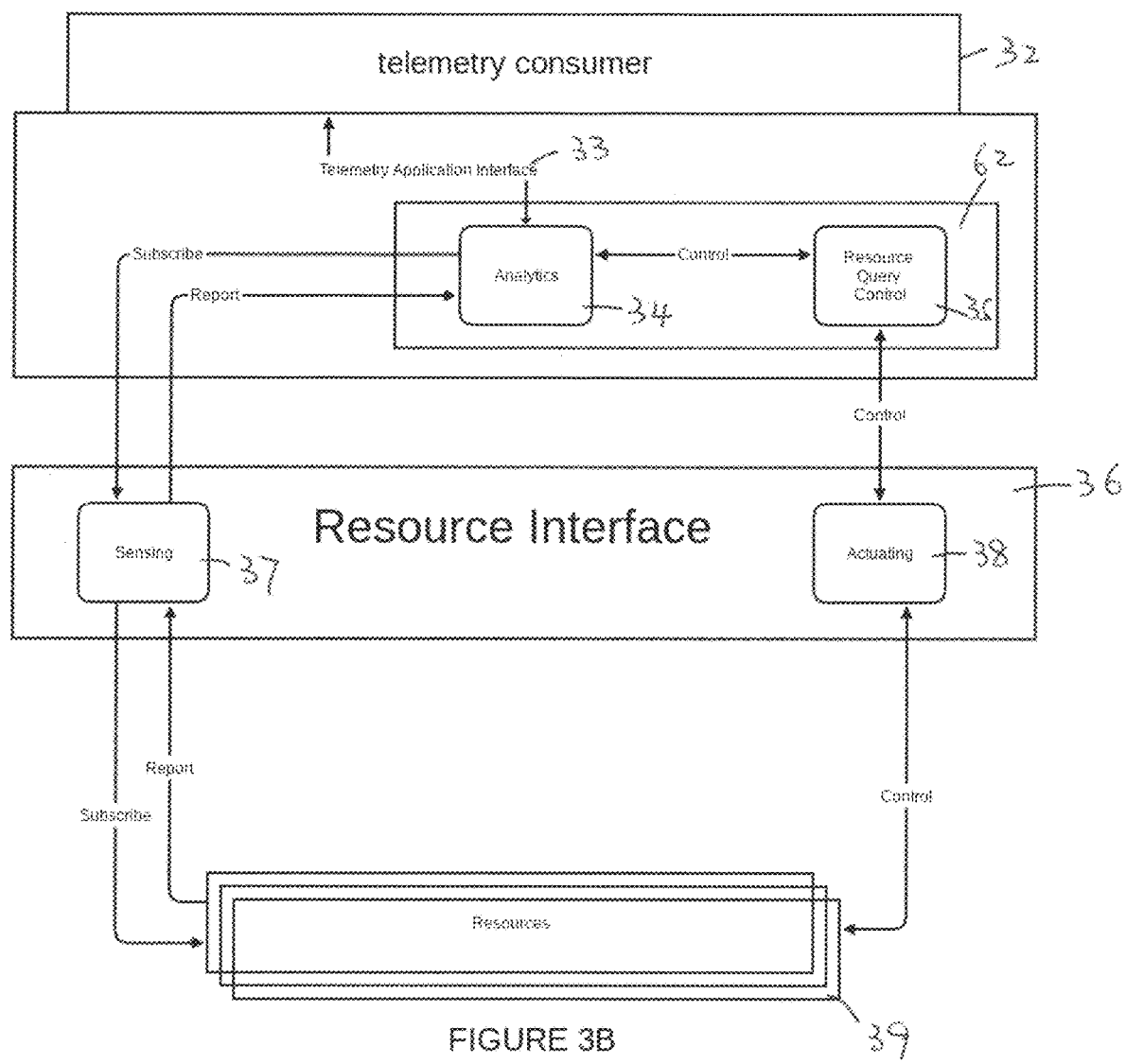
FIG. 3B is a block diagram illustrating the system of FIG. 3A, according to an embodiment of the present disclosure.

FIG. 3A illustrates an exemplary environment 30a in which a system 30 in FIG. 3B may collect analytics from resources including various systems or networks. In FIG. 3A, the system 30 may collectively include one or more control application hosts or servers, one or more control element hosts or servers, and one or more forwarding element hosts or servers, for collecting telemetry events or data from resources and forwarding the collected telemetry events or data to telemetry consumer hosts or servers 32 via switches or routers 20.

FIG. 3B shows an exemplary abstraction of the system 30 in FIG. 3A. The system 30 may be placed between the resources and telemetry consumers as an event broker. The system 30 may include an application interface 33, an analytics engine 34, a resource query controller 35, and a resource interface 36. Application interface 33 provides an interface between the system 30 and telemetry consumer 32 for the analytics engine 32 to forward the analytics to telemetry consumer 32. The system 30 may be an operating system or a platform, for example, a SDN operating system, and may include a plurality of nodes, running applications, controllers, and forwarding elements (FEs). The system 30 may be configured to filter events at different levels of a network hierarchy, such as at the one or more levels of the nodes, running applications, controllers, FEs and resources.

System 30 may be a network operating and control system that manages underlying resources, such as physical and virtual network resources. The resources may be resources of one or more systems, or networks. The system 30 may use the IETF ForCES architecture which provides a resource data modeling language, transport independence and a scalable and highly available distributed infrastructure. The system 30 may also use other modelling approaches such as protobuf, thrift, or self-describing json encapsulations. The system 30 may use the Logical Functional Block (LFB) as the schema abstraction for both resource operational state and data store. The data modeling capability allows system 30 to incorporate a wide array of network elements into a network.

As illustrated in FIG. 3A, the system 30 may include a plurality of hosts or servers to function as the application interface 33, the analytics engine 34, the resource query controller 35, and the resource interface 36. In some examples, the system 30 may include one or more processors or CPUs for performing the functions of the application interface 33, the analytics engine 34, the resource query controller 35, and the resource interface 36. In some examples, the system may be integrated in one or more computers, workstations or servers. The system 30 may be implemented in a cloud infrastructure, which includes a server farm or network cluster of high performance computers. The system 30 may also include memory for storing instructions, statements, APIs, files, and data, such as ROM, or RAM or other data storage medium such as hard disks to store the operating system, relevant applications, and telemetry data. System 30 may support multiple central processing units (CPUs) and application-specific integrated circuits (ASICs) and neural processing units (NPUs). The processors or CPUs in system 30 may be configured to execute the instructions, statements, APIs, files, and data stored in the memory. System 30 may operate on several platforms, such as Broadcom trident2, Ezchip NP4 and 5, Cavium NPs, Broadcom XLP NPs, Tiny MIPS 32 and X68 Linux. The platforms may be integrated in various devices, systems and networks as resources such that system 30 may collect analytics from these devices, systems and networks. For example, the system 30 may interface with these platforms, collect and filter data or events from these platforms integrated in various devices, systems and networks. In some examples, the system 30 may be a distributed system with components located in different level of networks, or different networks and communicated with each other via buses or communication networks.

The analytics engine 34 may collect data from the resources 39, such as distributed resources in various networks. For example, the analytics engine 34 may use the Request-Response (RR) and Publish-Subscribe (PS) control APIs that conform the system 30 to the ForCES Architecture to collect data.

In some examples, the module 62 may provide both a pull and push interfaces. Telemetry consumers 32 may either pull, using Prometheus for example, the telemetry data from the module 62 or the module 62 may be configured to, for example by programs or applications, to push the telemetry data to telemetry consumers. For example, the module 62 may be used to push the telemetry data to an InfluxDB consumer. The module 62 may also cache the telemetry data before the data is pushed or polled.

The resource interface 36 may include a sensing module 37 and/or an actuating module 38 for collecting analytics from resources 39 for telemetry consumers In some examples, the analytics engine 34 may subscribe to the events of the resources 39 via the sensing module 37 or publish-subscribe interface at the resource interface 36. The publish-subscribe interface 37 is used for streaming subscribed-to continuous telemetry data from resource sensors. The resources 39 may respond to the subscription with events in the manner as described in FIG. 1. In the example of FIG. 3B, the distributed resource may report subscribed events to the sensing module 37, which may forward the reported events to the analytics engine 34. The analytics engine 34 may then process the received subscribed events, for example, by caching the telemetry data which is polled by or pushed to a telemetry consumer.

The analytics engine 34 may then send processed telemetry data including processed events and processed GET response to the application interface 33 to the telemetry consumers. The application/service interfaces 32 consume the telemetry data 36 compiled by the analytics engine 34.

In some examples, the analytics engine 34 may use request-response control interface 38 for polling data. The analytics engine 34 may issue a GET request(s) via the resource query controller 35 for specific telemetry data. The GET request(s) may be sent to the actuating module 38 at the Resource interface 36. The actuating module 38 may then send the GET request(s) to the resources 39. The resources may respond to the GET request(s) with GET responses in the manner as described in FIG. 1. The GET responses from the distributed resources may be sent to the analytics engine 34 via actuating module 38 and the resource query controller 35. The analytics engine 34 may then process the received GET responses.

The system 30 may be configured, for examples, by applications, to process and/or monitor resources, For examples, the applications may enable system 30 to monitor the events of the resources 39, enable the resources 39 to report events of the resources 39 to the resource interface 36, and enable the resource interface 36 to forward the events to the analytics engine 34, and then to the telemetry consumers. For example, the applications in system 30 may use the MojaNet Application Layer (MAL) APIs.

Figure 3C:
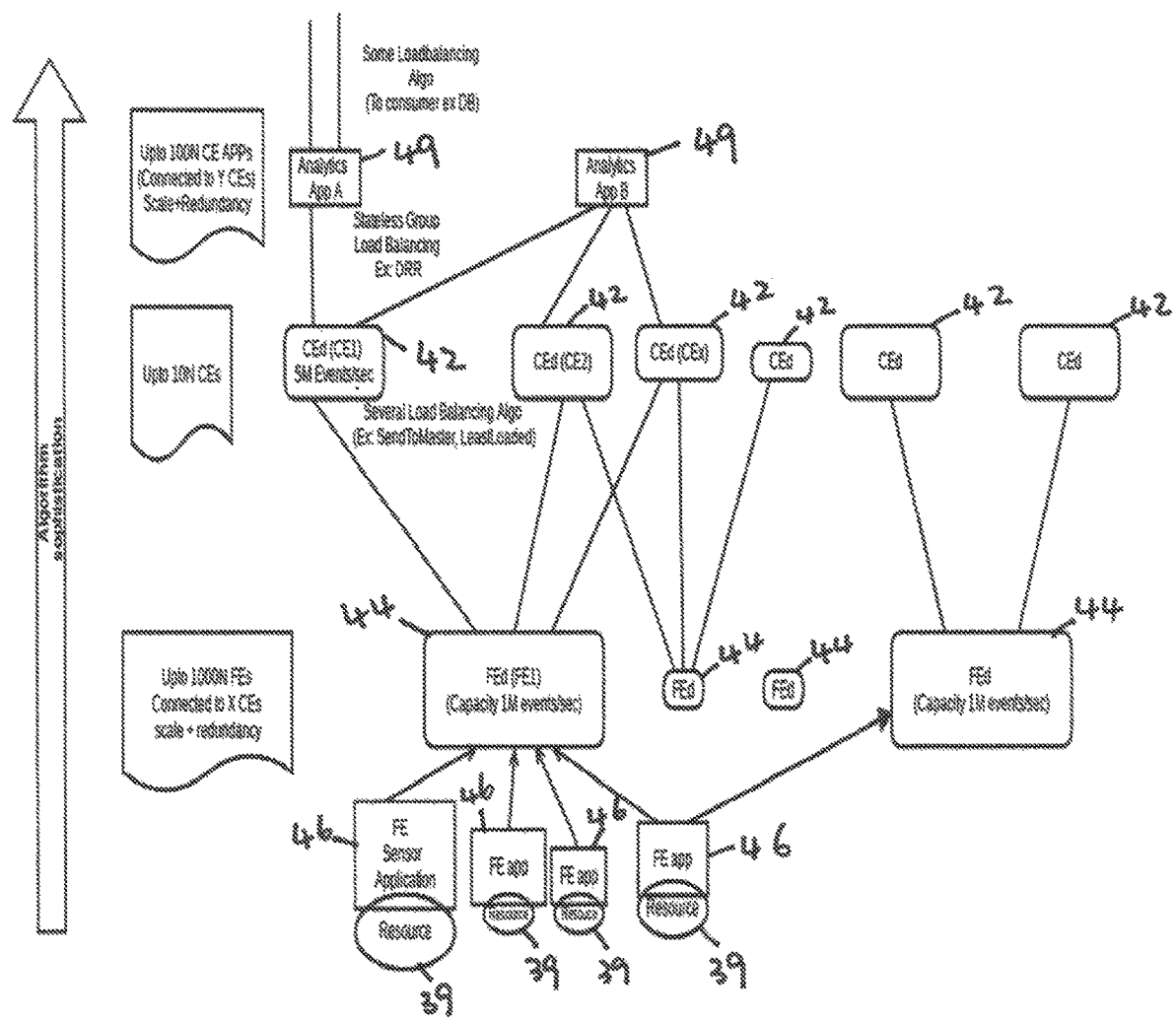
FIG. 3C is a diagram illustrating the system of FIG. 3B, according to an embodiment of the present disclosure.

In the example of FIG. 3C, the system 30 may have a logical structure 40. The structure 40 may include a plurality of analytics applications 49, CEds 42, FEds 44, and FE applications 46. The FE applications 46 may be used to collected analytics from the resource 39. The analytics applications A and B 49 may be the analytics engine 34 in FIG. 3B. The analytics application A in the example of FIG. 3C may also forward the collected analytics to the telemetry consumer. The resource interface 36 in FIG. 3A may include CEds 42, FEds 44, and FE applications 46. CEds 42, Feds 44, and FE applications 46 will be described in great detail below.

An application may be a control element (CE) application for a CE. As described in FIG. 3A, a control element (CE) may be a host or a server or a logical element defined in a host or a server. A CE application which offers a northbound interface may be referred to as a service. The CE application may reside above the CE where the application may actuate resources 39 by sending requests to the resources 39 and receive responses from the resources 39; or the application may express interest for resource events 39 by subscribing to resource events sensed at and reported by one or more FEs from the resources 39. An application may also be a forwarding element (FE) application and located at an FE. As described in FIG. 3A, a forwarding element may be a host or a server or a logical element defined in a host or a server. Such an application would be referred to as a FE application. An FE application may serve as an application for sensing the events of the resources 39 and reporting the events to one or more CE applications that have request for or subscribed to the events via an FE which delivers to a CE. An example of an FE application may be a "Sensor FE Application" in FIG. 3C.

An application may also be a local application that resides at a local location and only affects local resources, for example, a local CE application that does not participate in the distribution system.

An application may also be a hybrid application which connects to both remote and local busses. Typically such applications fit on the FE; such an application monitors resources and reports events towards the controllers.

The author of an application may subscribe to an event at various levels of the system 30. For example, the author of an application at the control level may invoke a MAL API call requesting to subscribe to an event on a specific FE the system 30. The system 30, such as the analytics engine 34, may send a message to one of possibly many CEs selected by the application.

In some examples, the same application may subscribe to a CE for the same event using a groupid feature by specifying their groupid in the subscription. A plurality of applications may be identified as a group and have the same group identification number. Examples of groupid will be described in great detail below. The CE may select a channel to the specified FE and forwards the subscription request. The FE may then issue a subscription request to the resource and on success, the FE may remember that the issuing CE is interested in the event. The FE may then proceed to respond to the subscription request from the CE.

For examples, in FIG. 3C, the CE on receiving the response may remember that the CE has subscribed to the FE and associate the subscription to the CE application that requested the subscription. At the FE level an FE application may subscribe to the resource event and broker events to the FE. When an event of interest occurs at a subscribed resource, the FE will be notified by the FE application. The FE will submit this request to specific CEs subject to FE load balancing algorithms described above.

A CE receiving an event may first determine if any groups of applications (as defined by a groupid) are interested in the event. If a group of the applications is interested, the CE may select one member application and send the event to the member application. If an application is subscribed but is not part of a group then the CE will always send the application the event.

The system 30 may collect data from the resources 39 via applications of forwarding elements. The forwarding element (FE) in a ForCES architecture acts as a slave to Control Elements (CEs). An FE is configured to connect to one or more CEs in a 1+M availability setup, where a single CE acts as a master and the rest M CEs are backups. For example, there are two High Available (HA) schemes described in RFCs 7121, 5811 and 7391: Cold-standby (or warm-standby) and hot-standby.

In some examples, cold-standby mode is configured on the FE by specifying a parameter, such as HAmode="1", in the fe config file stored in a memory of system 30. At in its life-cycle, an FE configured in Cold-standby will associate to only one CE at a time. This CE becomes the FE master. In the example of FIG. 3C, FE1 is associated with a CE1 but aware of CE2 and CEx in its list of usable CEs.

Hot-standby mode is configured on the FE by specifying the parameter, such as HAmode="2", in the fe config file stored in a memory of system 30. In Hot-standby mode illustrated in the example of FIG. 3C, an FE concurrently associates with one or more CEs, one of the CEs assumes a role as the FE's master. Hot-standby mode improves over cold-standby in two respects: (1). Reduced re-association latency. Given that the FE associates to two or more CEs in hot-standby implies when a master becomes faulty the fail-over to the new master setup and association is free. An FE assumes the next associated-to CE to be the master CE, decision which can vetoed by the CEs. The FE fail-over time is important when the FE is dealing with time-sensitive information that the controller needs to be aware of (2). More scale at CE plane. CE applications may connect to many CEs which are associated to an FE. Read-only transactions, such as GETs, may be issued on any CE while Write transactions, such as SETs and DELs, may be issued only via the master CE. An intelligent CE application may take advantage of such knowledge and distribute the load across multiple CEs.

As will be described in great detail below, the system 30 may include filters at various strategic hierarchies of the system 30 to scale the consumption of telemetry data and allow fine grained filtering of resource attributes. For example, the filters may be deployed and available at CE applications, at CEs, at FEs, and/or at FE applications. For example, the system 30 may configure at analytics engine 34 the filters at different levels of system 30, or at selected levels of system 30. In deployment of analytics collection in the system 30, this ability to distribute the filters in strategic hierarchies in the system 30 may help further reduce the cost of computation and IO hence scaling the system 30 further. As such, fine-grained filtering of resource attributes may help horizontally scale the consumption of telemetry data; and the scaling performance of the system 30 may be improved by moving filters closer to the source of the event.

With respect to an SDN solution, usability and maintainability of the filters is important. For example, APIs capable of expressing filters may be used to inject filters in system 30 to filter out irrelevant telemetry date. As described in FIG. 3B, the resource interfaces 36 in system 30 may work in the same semantics for both poll and push. In system 30, adding new filtering attributes may not require infrastructure updates, namely that, no code changes are required for either the sensor or the consumer of events, and this may help reduce maintenance costs.

Distributed Level Sensor Scaling

The system 30 may be based on the IETF ForCES standard. System 30 may be any types of hierarchical event broker. Control functions and forwarding functions in a software-defined networking (SDN) are separated.

Figure 4:
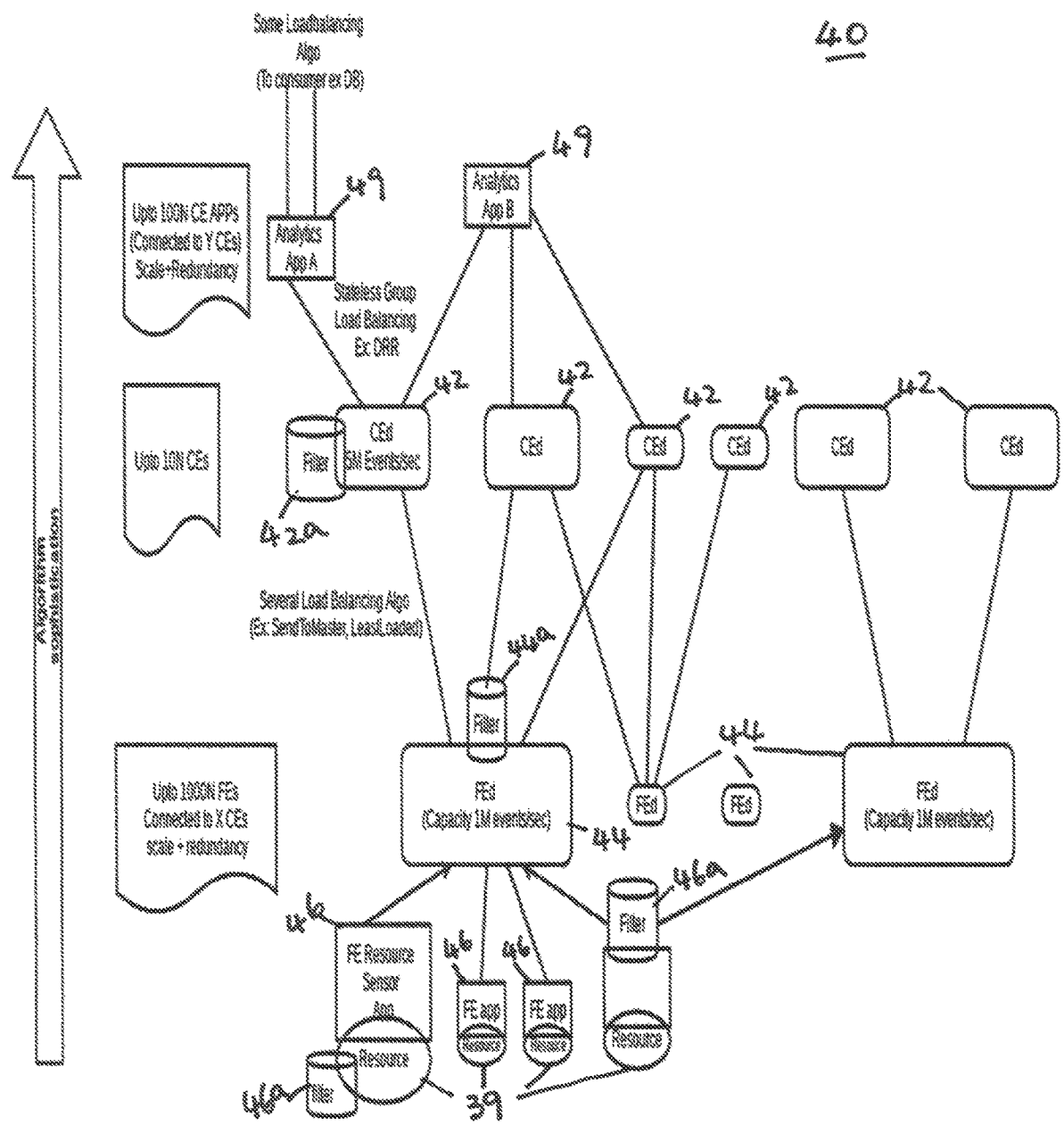
FIG. 4 is a block diagram illustrating a system for analytics collection, according to another embodiment of the present disclosure.

FIG. 4 illustrates the logical structure 40 of the system 30 with filters injected or distributed in different levels of the structure 40. The analytics engine 34 and the resource interface 36 may include a plurality of analytics applications 49 subscribe to resources through CEds 42, Fed, and FE applications. FE applications 46 subscribe to resources events. In the example of FIG. 4, filters may be added to various elements of a network hierarchy in order to improve availability and scaling of event consumption. For example, filters 46a may be added at the FE applications, filters 44a may be added at the FEd, filters 42a may be added at the CEd. The Control Element daemon (CEd) 42 allows multiple applications to connect and subscribe to events as well as issue request-response commands. A CEd 42 is connected to one or more Forwarding Element daemons (FEd) 44, for example via cold standby or hot standby modes as described above in FIG. 3B. An FEd 44 interfaces to resources. An FE application 46, acting as a resource sensor, may interfaces to one or more resources 39. In the example of FIG. 4, a FEd 44 may have a capacity of handling 1 Million events per second, and a CEd 42 44 may have a capacity of handling 5 Million events per second. The analytic engine 34 in FIG. 3B may include up 100 CE analytics applications, up to 10 CEs, and up to 1000 FEs.

In some examples, the CEds 42 and FEds 44 are abstractions towards resources. The request-response and publish-subscribe APIs are brokered by the CEd and FEd. The Resource Interface 36 in FIG. 3B may also be included CEds 42 and FEds 44.

In system structure 40, computation or algorithm sophistication increases from the resources 39 towards the analytics applications 49.

To scale event production and consumption, system 30 may be modified in view of the ForCES architecture in relation to events: In ForCES architecture, filtering is more coarsely grained at event-type level. In system 30, more fine grained filtering at the key level may be constructed to filter the events, as will be described in Filter And API Structuring below. As will be described below, system 30 has extended the GET/query to be more fine grained by specifying the CEs to receive the events. System 30, may use added reliable event extension at the both consumer and producer. With the event extension, a consumer responds acknowledge receipt of an event. This is important for events that must be delivered to at least one consumer, such as billing information, catastrophic events, etc., to increase the reliability of reporting the events with acknowledgement from the consumer.

As an example, an event in the ForCES architecture may be sent from the resources to the control applications in only one attempt, and may not be retransmitted. The resource or application/broker CEd or FEd has no knowledge whether any consumer has received the event. In some examples, system 30 extends the messaging of the event to allow for the consumer application to acknowledge receipt. For example, the system 30 provides the extension via an API, such as an MAL API, requesting the consumer to acknowledge receipt of the event. A resource or broker of a resource may send an event report to the system 30 acknowledging receipt of the event.

FE Application Scale Contribution

In order to scale events production, in the example of structure 40 in FIG. 4, system 30 may include multiple FE applications 46 distributed at various resources 39 to assist FEs to its function, with each FE application 46 handling one or more events from the resources 39. FE Applications 46 may act as subscribers to resource events. FE applications 46 may be interchangeably referred to as "sensors". On its southbound interface, an FE application 46 subscribes to one or many resources 39 for events. On its northbound, an FE application 46 sends its learned events to the FEd 44. A plurality of FE applications 46 may subscribe to the same resource 48, each listening to only a subset of the events generated by resource 48. This allows system 30 to scale when a large number of events are generated by a single resource 39.

FE-CE Interface Scale Contribution

An FEd 44 may act as a distributor of events to CEds 42. A FEd 44 may be associated to one or more CEds 42 for the purpose of scale and high availability. At the FEd level, for state scale reasons, a FEd 44 may be only aware of which CEds 42 are subscribed to what events that the FEd 44 can handle. When the FEd 44 receives an event from an FE application 46, the FEd 44 decides which CEd 42 receives the event. System 30 may extend the ForCES standard to allow different applications at the FEd 44 to select which CEd(s) 42 should receive a specific event. For example, this configuration feature may be included in an FE configuration file stored in a memory of system 30, such as fe.conf, for the FE. In system 30, an event may be sent from a FEd 44 to a CEd 42 by one of the following manners:

The FEd 44 may broadcast to all CEds 42 of the event. This is the default policy described in the ForCES standard.

The FEd 44 may send the event to a Master CEd 42 only. In this case, the FEd sends events only to the recognized master CE as long as the master CE subscribes to the event. When the FEds 44 in a cluster are distributed strategically across multiple CE masters, this approach allows scaling of event distribution.

The FEd 44 may select the least loaded CEd 42. The FEd 44 in this case sends events to the least loaded CEd 42 subscribed to the event.

The FEd 44 may round robin CEd 42 selection. The FEd 44 in this case sends events to the next available CEd 42 subscribed to the event.

The FEd 44 may send the event to subscribed CEds 42 only. In this case, the FEd 44 sends events to all CEds 42 that have subscribed to the event. When the FEds 44 in a cluster are evenly distributed strategically across multiple CEd masters, this approach may be used with CEd apps selectively subscribing to CEds 42 for certain events and may substantially improve scaling effect.

CE-Application Interface Scale Contribution

System 30 has interfaces which allow both the CE application and CE to contribute to scaling of event consumption as described below.

Application to CE Interface Scale Contribution

APIs, such as MojaNet Application Layer (MAL) APIs, may be used in system 30. As an example, the Analytics App "B" 49 in FIG. 4 is connected to multiple CEs. The application layer of system 30 may handle event request routing as well as event subscription based on the needs of telemetry consumers. From an analytics point of view, the system 30 allows to select where to subscribe to the events in system 30, what events of system 30 to subscribe to, and where to issue GET requests at the system 30. The system 30 may use at least one of the following methods:

Select Master CEd. All GET requests and event subscriptions are made to the FE's master CEd. This is per FE selection. Different CEds may be the masters of different FEs. For example, the MAL layer discovers which the CEds as the masters of specific FEs.

Select the least loaded CEd. GET requests and event subscriptions may be sent to the least loaded CEd at the time the transaction is issued. Write operations on the FE in this case, such as a SET command, may go through the master CEd of the FE.

Use Round Robin (RR) CEd selection. GET requests and event subscriptions go to the next available CEd at the time the transaction is issued. Write operations on the FE, such as a SET command, may go through the master CEd.

CE to Application Grouping And Scaling

As described above, the APIs, such as MAL APIs, or analytics applications 49 may include applications that are associated with a groupid. The groupid may be used to aid the CEd 42 to scale events towards the applications. One or more CE applications connecting to a single CEd 42 may subscribe to the same event with a filter tag referred as "groupid". When the CEd 42 receives an event, the CEd 42 may be configured to determine which CEd application or applications should process the event. An example of a mix of RR and Least Loaded methods to select the CE application/applications to send the event to is as follows:

1. Select a CEd application from the group list of event's subscribed applications.
2. Determine if the application is overloaded. If it is overloaded, go to step 4. If the application is not overloaded go to step 3.
3. Send the event message to the selected application.
4. Select the next available application from the list. If the applications have been selected once, the event may be dropped and the state of the event may be logged in system 30. Else go to step 2.

Runtime Scaling

In some examples, system 30 may include a scheduling CE Application for collecting analytics and monitoring applications CEds 42 and/or FEds 44 which may include CPU and memory utilization and path characteristics. In some examples, the scheduling CE application that connects to all CEs may be used for Load-balancing and HA by restructuring the CE mastership of FEs. The scheduling application may factor in monitored cluster load to not only include CPU and memory utilization but also path characteristics. The scheduling CE application may be used to 1. Influence election of CE mastership when an FE comes online for the FE to elect a master CE;
2. Reschedule the distribution of FE to CE mastership at runtime based on load;
3. Reschedule the distribution of FE to CE mastership when an FE is removed;
4. "Boot" new CEds 42 at runtime when current CEds 42 are unable handle existing load;
5. "Boot" new CE applications within a group when current executing CE applications are not able to handle the events.

For example, items 1, 2, and 3 above may be achieved by messaging to the FE from a scheduling control Application. The scheduling control application may affect the provisioned information at the FE by modifying its runtime values. Items 4 and 5 above may be achieved by infrastructure commands. CEd 42 and CE application may be started like any other applications or may be tied into orchestration system which is able to start and stop applications, for example the orchestration system may be docker, kubernetes etc.

Usable Programmatic Interfaces

As illustrated in the example of FIG. 4, filters may be placed at different location of the network hierarchy 40 to filter events, such as at FE resource sensor application level, the FEd level, and the CEd level.

The different entities are implemented in system 30. A subscription request of a consumer to resource associated with an FE application 46 may be subscribed via one or more CEs. The CE may cache filter state or subscription. As such, the CE remembers to send the subscribed event to the consumer when the event is received from the FE. At the FEd level, the filters are placed at point of either receiving a response or where events are received. For example, when system 30 communicates to a kernel of an operating system, such as a Linux kernel, the filters may be placed in "the Linux bus" and carried to the relevant FE or CE. For the control applications for a CE, great detail will be provided below with respect to system 40. For FE applications 46 which work as resource brokers, same approach applies to FEd 44. For example, in the southbound, the FE applications subscribe to the resource—for example on the linux bus. on their northbound, the FE applications 44 submit the events to the FEd Filter Model All resource attributes need a formal definition. Typically, all resource attributes need a formal definition of their type(size), names and numeric identifiers. Names may be used for APIs and numeric identifiers may be used for efficient wire transmission. The ForCES Logical Functional Block (LFB) data model is an example of formal definition of resource attributes.

The Logical Functional Block (LFB) data model describes the attributes that may be filtered on. In an example, a resource modeled as an indexed table(array) in Table1 may constitute the following instantiated layout:

TABLE 1

| Index | foo | goo | bar | gah |
|---|---|---|---|---|
| 2 | 5 | 1 | 123 | 75 |
| 4 | 61 | 6 | 10 | 84 |
| . | | . | | |
| . | | . | | |
| 99 | | | | |
| 2344 | 97 | 1 | 80 | 49 |

In an example, the resource may generate a Table1Created event when a new entry is created, a Table1Deleted event when an existing entry is deleted, and a Table1Changed event when an existing entry is updated.

With the definition of the resource attributes, the event of the resource may be filtered to forward only relevant events to the consumers. Relevant events may be selected by the filters located at various levels of system 30. Filters may be defined based on the resource attributes and Filter operands.

For example, in system 30, a user may subscribe to Table1Created event and refine the subscription with filters of the form:

(foo=5||goo<6)&&(bar !=10 && gah>10)

Figure 5:
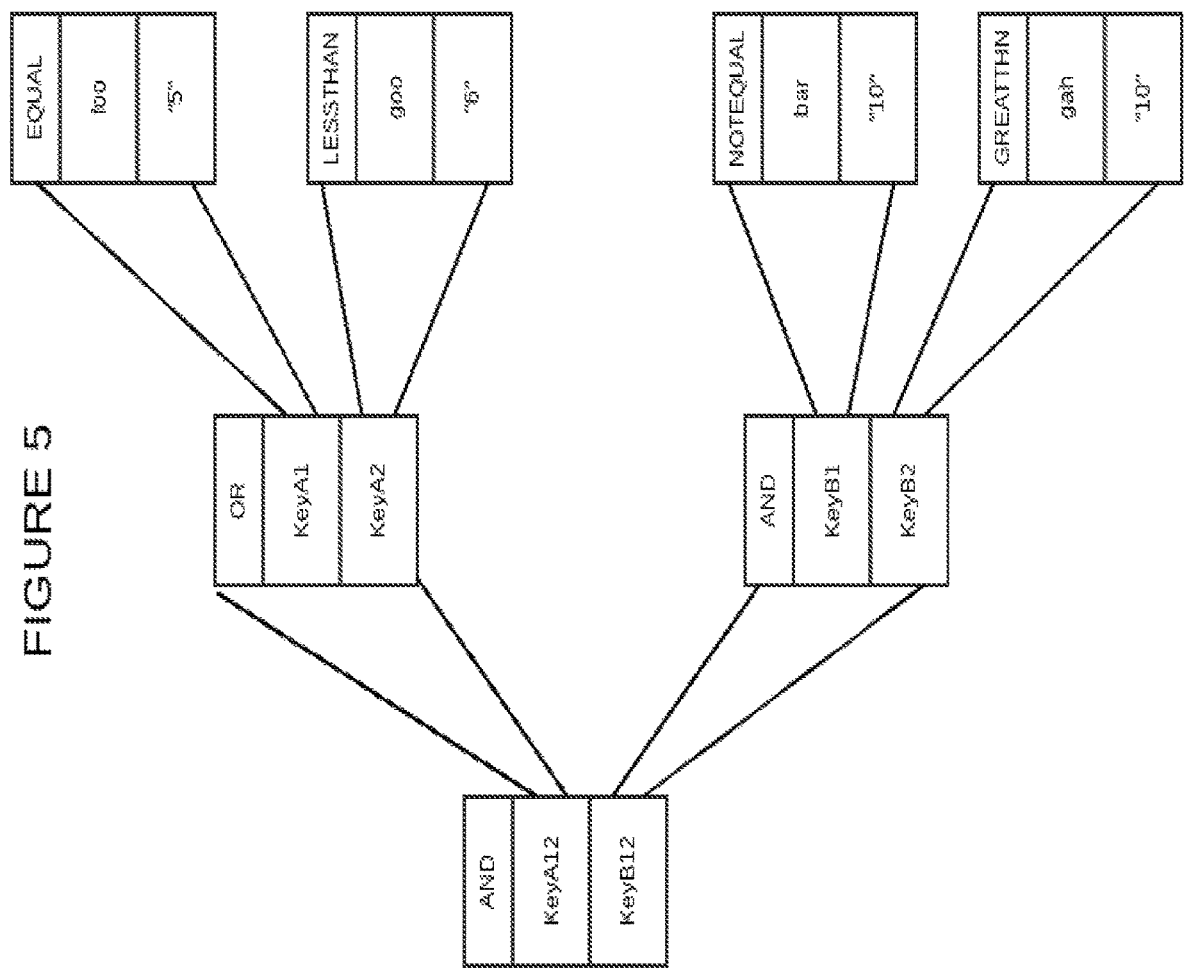
FIG. 5 is a block diagram illustrating a filter structure, according to an embodiment of the present disclosure.

An exemplary structure of the filter is illustrated in FIG. 5.

When a table row is created in Table1 above, a Table1Created notification may generated. Subjected to the filter above, and if the event passes all of the criteria set out in the filter, the notification event may be sent to all entities that have subscribed to this event. For example, when row with index 2 is create, as this event in index 2 meets all the criteria of the filter, the event will pass the filter and be sent to subscribers. On the other hand, when index 2344 is created, as the event in index 2344 does not meet all the criteria of the filter, the event will be blocked by the filter.

A GET request with filter of the form:

(index>0 && index<5)

may return row entries with indices 2 and 4.

Filter operands will described in more details below.

Filter Operators

In some examples, the filter grammar used in system 30 may be in the form of:

```
(EXPRESSION CONDITIONALOP EXPRESSION)+
EXPRESSION := operand RELATIONALOP value
CONDITIONALOP := condition logical operator
RELATIONALOP := relational or equality operator
```

The relational and equality operators supported are:

| Operator | Description |
| --- | --- |
| = | Equal |
| != | Not Equal |
| > | Greater Than |
| < | Less Than |
| >= | Greater than or equal |
| <= | Less than or equal |

The condition logical operators supported are:

| Operator | Description |
| --- | --- |
| OR (\|\|) | Returns TRUE if either component condition is TRUE. Returns FALSE if both are FALSE. |
| AND (&&) | Returns TRUE if both component conditions are TRUE. Returns FALSE if either is FALSE |
| NOT (!) | Returns TRUE if the following condition is FALSE. Returns FALSE if it is TRUE. |

Composite Expressions

System 30 allows for expressing more general filter expressions. An exemplary list may be specified thus:

(foo=5||foo=6||foo=15)

And an exemplary range thus:

(foo<5 && foo>15)

Filter Metadata

In some examples, resource attribute metadata, and resource data, may be used for filtering. System 30 may use, for example, ForCES event metafiltering. ForCES allows to define a metafilter that is applied on the filters before accepting them. Different filter metafilters may be defined, including event Count, event Interval, and event Hysteresis.

Reference is made to RFC 5812 section 4.8.5.1 titled "Common Event Filtering". An example of the interaction of conditions is an event with an eventCount property set to 5 and an eventInterval property set to 500 milliseconds. Suppose that a burst of occurrences of this event is detected by the FE. The first occurrence will cause a notification to be sent to the CE. Then, if four more occurrences are detected rapidly (less than 0.5 seconds) they will not result in notifications. If two more occurrences are detected, then the second of those will result in a notification. Alternatively, if more than 500 milliseconds has passed since the notification and an occurrence is detected, that will result in a notification. In either case, the count and time interval suppression is reset no matter which condition actually caused the notification.

Built-In Metadata

In some examples, system 30 may predefines built-in resource analytics metadata. These include:

Time first received from resource: TFReceived

Time last updated in storage: TSLastUpdate

Time last accessed in storage: TSLastAccess

Time extracted at resource: TRExtracted

Time last used at resource: TRUsed

Source nodeType, for example "FE", "CE", "Local", etc

Nodeid, for example, node type "FE" NodeId "2" implies FE2.

LFB Name and LFB Name: LFBName, LFBID

LFB Instance and Name: InstanceID, InstanceName

Resource path: ResourcePath

A metadata filter be be specified to extend a data filter. An example expression may be:

(NodeType="FE" && NodeId=2)

The metadata filter matches data from FE2 in addition to any specified data filter.

Filter and API Structuring

The filter structures may be constructed in a hierarchical format. System 30 may construct different API filters, including structured Filter API, Lua Filter API, and Binary Filter API. Each of the filters may have a different execution mode at its resident location. For example, the filters may have a different execution mode either at the target resource or at an intermediate node in the path towards the resource. For example, the execution environment of structured filters construction may be part of the FE/CE LFB defined and generated code; Lua filers may include a Lua VM at the filter execution environment; and bpf filter may include a classical bpf VM at the filter execution environment.

For example, the filter described below:

(foo=5||goo<6) && (bar !=10 && gah>10)

An example of this filter structure is illustrated in FIG. 5.

In some examples, the filter in a structured filter API may use the MAL GET API as follows:

```
const char *myfilter = "(foo = 5 || goo < 6) && (bar != 10 && gah > 10)";
key = cal_create_keyobj("/MyLFB/Table1/Value")
cal_set(key, myfilter)
MAL_getbykey("/FE/12/MyLFB/1/Table1", .., key, ...)
```

The filter in a Lua filter may be constructed below:

```
myluafilter = (cobj["foo"] = 5 or cobj["goo" < 6) and
    (cobj["bar"] ~= 10 and cobj["gah"] > 10)
Key = cal_create_keyobj("/MyLFB/Table1/Value", LUAMODE)
cal_set(key, myluafilter)
MAL_getbykey("/FE/12/MyLFB/1/Table1", .., key, ...)
```

There are several types of binary formats. For example, the filter in a classical BPF binary filter may be constructed below:

```
mybinfilter = format_binary_cbpf("(foo = 5 || goo < 6) && (bar != 10 &&
    gah > 10)")
Key = cal_create_keyobj ("/MyLFB/Table1/Value", CBPF)
cal_set(key, mybinfilter)
MAL_getbykey ("/FE/12/MyLFB/1/Table1", .., key, ...)
```

Wire Formats

System 30 modifies the ForCES protocol by introducing a TLV to carry structured filter format in the Table below:

| Type = SKEYINFO | Length = Total length |
| Index = Key attribute ComponentID | |
| Length | Flags |
| Values . . . | |

The Flags, which may have 16 bits, are used to describe the filter type (8 bits) and type content (8 bits). The type content flags may indicate operators that are conditional(C) and relational(R) and Values will carry the operand values or hierarchies of even more KEYINFO TLVs. TVL is a construction for sending data. With TVL, data may be variable sized or optional.

The Lua filter may be carried on the wire as a string content of the LKEYINFO TLV, as shown in the table 3 below:

TABLE3

| Type = LKEYINFO | Length = Total length |
| Value: Lua program | string |

Fine Grained Event Reporting

System 30 may extend the GET/query to be more fine grained, for example, by specifying the CEs to receive the events. To gain more control over the granularity of the event reporting, system 30 may add exceptions to the ForCES architecture. In some examples, system 30 may allow backup CEs to subscribe and unsubscribe to FE events. This implies that the rule that Writes can only come from the master CE is not kept. In system 30, no CE can over-write another CE's subscription. This may be accomplished by maintaining an extra state at the FE, namely that a per-event state subscription specifies at granularity the CE that is interested in the event.

The Console output example below illustrates two CEs subscribing to the same event. This is from the perspective of an FE connected to those CEs:

```
LFB 0x7f05999f1380 = <MyCEvent> CLASSID 666 Ver 1.0
    RX(36B 3P) TX(36B 3P) ER(0B 0P)
    INSTANCE 1 RX(36B 3P) TX(36B 3P) ER(0B 0P)
        Event(CBogChanged) id: 1
```

```
        subscriber(1): xeid 0x40000005
            Tx(230B 3P) Txerr(0B 0P)
        subscriber(3): xeid 0x40000003
            Tx(230B 3P) Txerr(0B 0P)
``` the two CEs (3 and 5) are recognized as having subscribed to the event for Logical Functional Block (LFB) "MyCEvent" instance 1. The number after the annotation subscriber that is in parenthesis (1 from CE5 and 3 from CE3) is the number of times each CE has issued subscription request for the event. This equates to the CE applications connected to the CE that is subscribed to the FE event. The number of times may be a reference count. For example, every time a CE application subscribes, via a specific CE, then that CE's event refcount is incremented at the FE state, and every time a CE application unsubscribes, the refcount is decremented. When the refcount is zero, the state is removed by the FEd. For example, if no control application is interested in events being brokered by an FEd (by virtue of no subscriptions), by removing the state from the FEd, the FEd stops sending these events to its associated CEs and this saves resources.

Adding Event Distribution Algorithms

As system 30 has access to the different CE-specific subscription states at the FE, the system 30 may allow for more fine grained approaches to balance the event load towards the CEs. In the Console output example below (initiated by the f key) shows the description of the different supported algorithms:

```
Configured Event algorithm: SubscribOnly
Used Event algorithm: SubscribOnly
Known Algorithms:
    Default: Broadcast to all CEs
    MasterOnly: Send To Master CE
    SubscribOnly: Send To Subscribed CEs only
```

The example above shows the FE configuration requested ("Configured Event algorithm: SubscribOnly"), the algorithm that system 30 decides to use ("Used Event algorithm: SubscribOnly"), and other supported loadbalancing algorithms exist ("Known Algorithms:").

In this case, the knowledge for load balancing is performed at control applications, namely CEds, which subscribe to specific FEs for different events based on load balancing heuristics. The FEd may simply forward the telemetry data to the CEs, and the CE application determines the path to forward the data. The CEs may subscribe available events based on the FE applications connected to the CEs.

The event distribution algorithm may be configured via the fe config file using the "eventalg" stanza. The "configured" vs "used" algorithms may differ if the configured algorithm is not supported.

Default Event LB Algorithm

By default, when no configuration is provided or an unknown algorithm is configured, the system 30 uses default algorithm. For example, the default algorithm can also be explicitly configured in a fe config file, for example with the entry: eventalg="Default". The default algorithm conforms to standard ForCES requirements, and all events are broadcast to all CEs.

MasterOnly Event LB Algorithm

In system 30, the MasterOnly algorithm can be specified in fe config file, for example with the entry: eventalg="MasterOnly". The MasterOnly algorithm may send events only to the master CE as long as there is subscription from the master CE. When the FEs are distributed strategically across multiple CE masters this approach allows scaling of event distribution.

SubscribOnly Event LB Algorithm

In system 30, the SubscribOnly algorithm can also be selected in fe config file, for example with the entry: eventalg="SubscribOnly". The SubscribOnly algorithm sends events to all CEs that have subscribed to the event. When the FEs are evenly distributed strategically across multiple CE masters this approach can be used with CE apps selectively subscribing to CEs for certain events and may scale substantially better.

Application Level Consumer Scaling

Figure 6A:
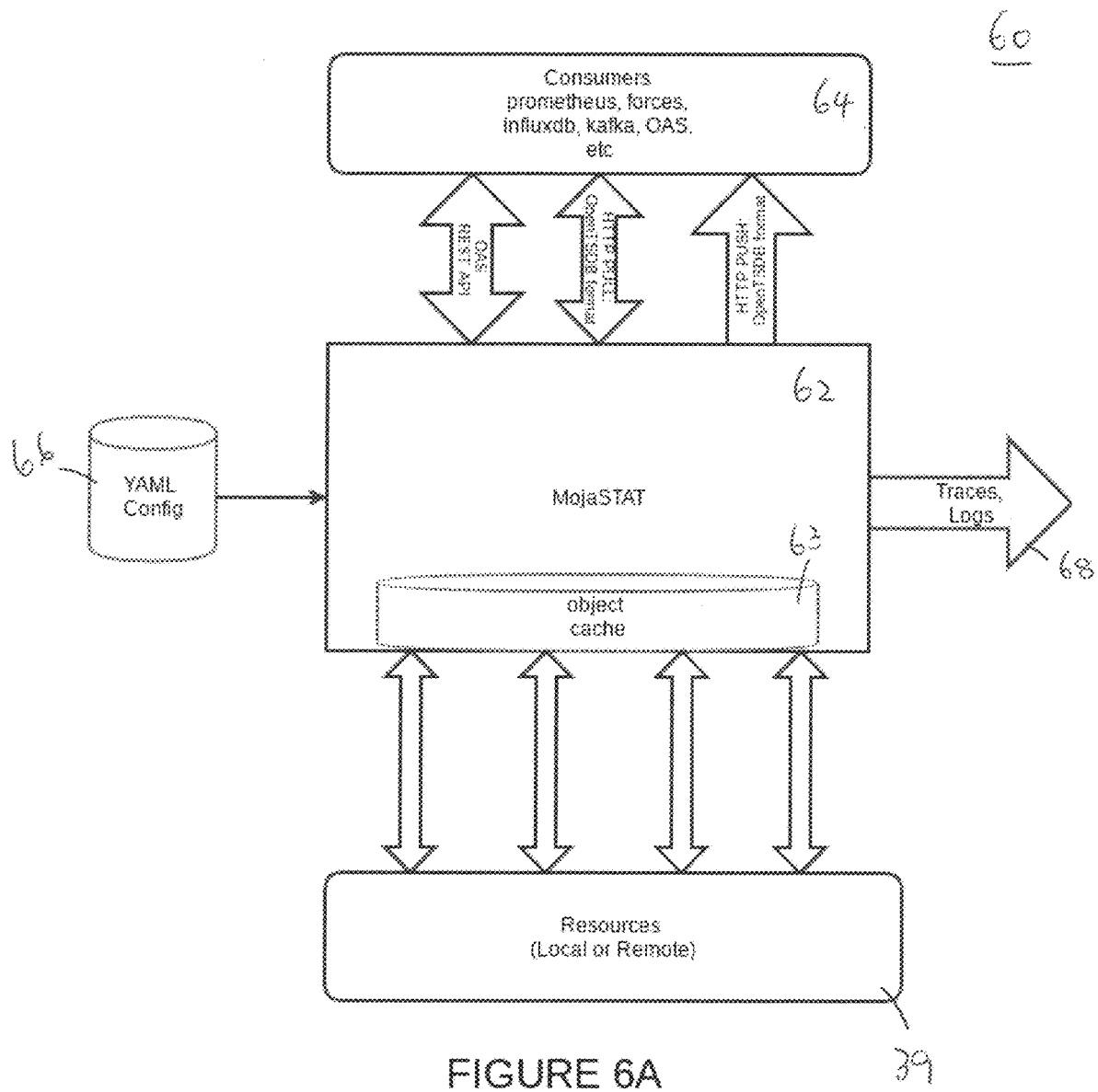
FIG. 6A is a block diagram illustrating a system, according to another embodiment of the present disclosure.

FIG. 6A illustrates another exemplary system 60. System 60 provides an example of an application to consume events. In this regard, system 60 may include an analytics module 62 that provides access to bulk time series data and event driven updates and alarms. Analytics module 62 is an example of system 30 and includes the elements describes in FIGS. 3B and 4.

Analytics module 62 may act as a broker to northbound consumers of metrics, such as time series databases or proxies. The analytics module 62 may interface to one or many local or remote resources on the southbound.

The analytics module 62 may use a telemetry function to collect subscribed events from one or more controllers (CEs) connected to one or more Forwarding Elements (FEs). On its northbound interface, analytics module 62 may provide a variety of output plugins to push time series data into multiple consumers of the collected data at predefined intervals. Analytics module 62 also allows pulling of time series data, request from the applications, such as prometheus, and OAS. Analytics module 62 supports a number of outputs, including influxdb, Prometheus, forces, kafka, and OAS.

In some examples, system 60 may use third party applications, such as Prometheus and Grafanaas telemetry consumers 32 or 64. The analytics module 62 may act as the application interface 33, analytics engine 34, resource query controller 35, and the resource interface 36 as described in FIG. 3B.

System 60 may also act as a multiplexer to northbound consumers of metrics 64, such as time series databases InfluxDB. On its southbound, the system 60 may interface to one or more CEs using groupids. System 60 or system 30 may also include a YAML Config 66, traces and logs 68. YAML is a markup language that is used by system 60 to store configuration information. YAML instructs system 60 various activities, such as how to setup the resources to monitor the events of the resources, as described above. Logging and tracing 68 may be standard logging mechanisms such as syslog.

In some examples, the system 60 may include OAS Rest applications, conduct HTTP POLL with OpenTSDB format, HTTP PUSH with OpenTSDB Format.

The analytics module 62 may include an object cache 62. Events from the local and remote resources 39 may be stored temporarily in the object cache 63 of the analytics module 62.

A user of system 60 may describe the bridging of resource sourced events and consumers. The system 60 may also include a YAML configure module 66. With system 60, the new metric collection may be described in the YAML configuration file; system 60 or system 30 may use MAL interfaces to discover the resources and bridge between the southbound resources and northbound consumers.

Figure 6B:
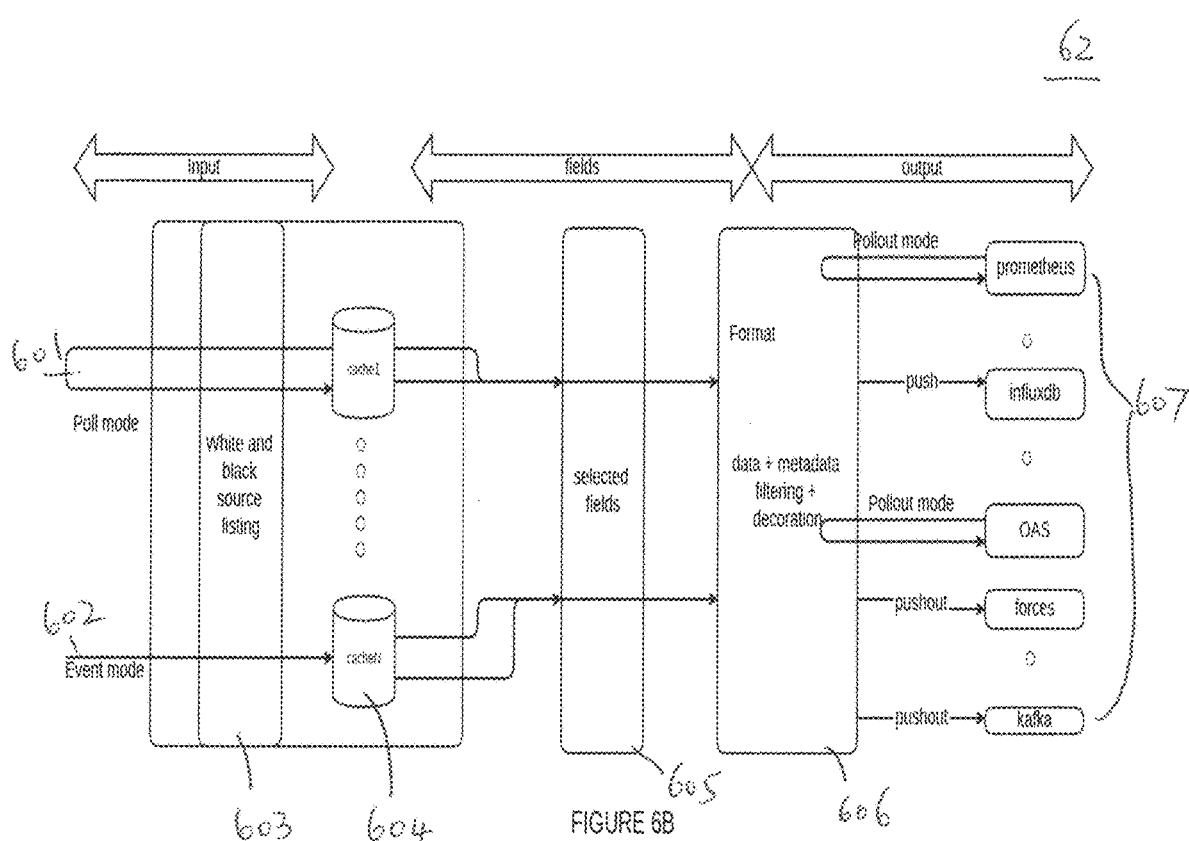

FIG. 6B illustrates an exemplary internal architecture of analytics module 62. In FIG. 6B, analytics module 62 may collect events or telemetry data from resource 39 via FEs, using a poll mode 601 and/or event subscription mode 602. The analytics module 62 may include resource filters, such as the white/black source list filters 603, and field filters 605. The collected events may be filtered by the white and black source listing 603. The filtered events may be temporarily stored in a cache 604 of the analytics module 62, such as cache 1 and cache N. The cached event may be further filtered with the selected fields 605. The filtered events may be packaged at the format 606. The purpose of format 606 is to process the data for specified consumers. As an example, most Time Series Database consume a format which takes the format of: {Metric, metric metadata, timestamp}, format 606 may have sufficient knowledge to create such a format based on the YAML description in YAML config 66. The format 606 then may output relevant events to different telemetry consumers 607.

A configuration file, such as a YAML file may be used to configure analytics module 62 or the analytics engine 34 in system 30. The prescribed analytics module 62 application instance invokes underlying APIs of system 30 described above. For example, the APIs may inject one or more filters, such as a structured filter, towards the resources via the CEs. The filter may be deployed at different nodes along the path towards the resources of interest and eventually at the resource. As shown in the example below, a sample YAML file may prescribe an application instance. This instantiation, on startup, subscribes to analytics for Port Statistics changes (PortStatsChanged) on all FEs that CEs 1-3 are aware of the filter may be configured to only accept events from all FEs as long if the port resources has the name of "eth12" or "br0", and the ports received the data in the last 120 seconds, Upon receiving the filtered data or events from the resources, analytics module 62 or analytics engine 34 may transform the filtered data or events from ForCES to a format that can be consumed by Prometheus Push Gateway (PGW). As shown in the example below, the transmitted and received byte counts may be pushed to the prometheus push gateway located at 10.0.0.12:9091.

```
input:
    Sourcetype: "CE" #FE also valid
    SoureIDs: "1-3"
    kind: "Event"
    AcceptList:
        - "/FE/*/Port/*/PortStatsChanged"
    #DenyList::
    #   - "/FE/*/Port/1234/*"
fablock:
    FilterKind: "Structured"
    filter: |
        - ifname = "eth12" || ifname = "br0" #data filter
        - TRUsed <= 120" #metadata filter
push:
    #target prometheus push gateway
    - plugin: "prometheus_pushgateway"
      name: "prometheus0"
      config: |
          jobname: "portstats1"
          target:
              host: "10.0.0.12"
              port: 9091
          metrics:
              - field: "stats/rx_bytes"
                name: "rx_bytes"
              - field: "stats/tx_bytes"
                name: "tx_bytes"
          labels:
```

-continued

```
  - field: "name"
    name: "iface"
  - field: "ifindex"
```

In the example above, the filters and metafilters are defined to use the structured interface. Other formats may also be used. As an example, a filter below is defined in the YAML configuration to use Lua format to accept data when the tx_bytes exceeds 1000000 bytes:
filter: >-
cobj["stats"]["tx_bytes"]>1000000

Resource Level Sensor Scaling

Figure 7:
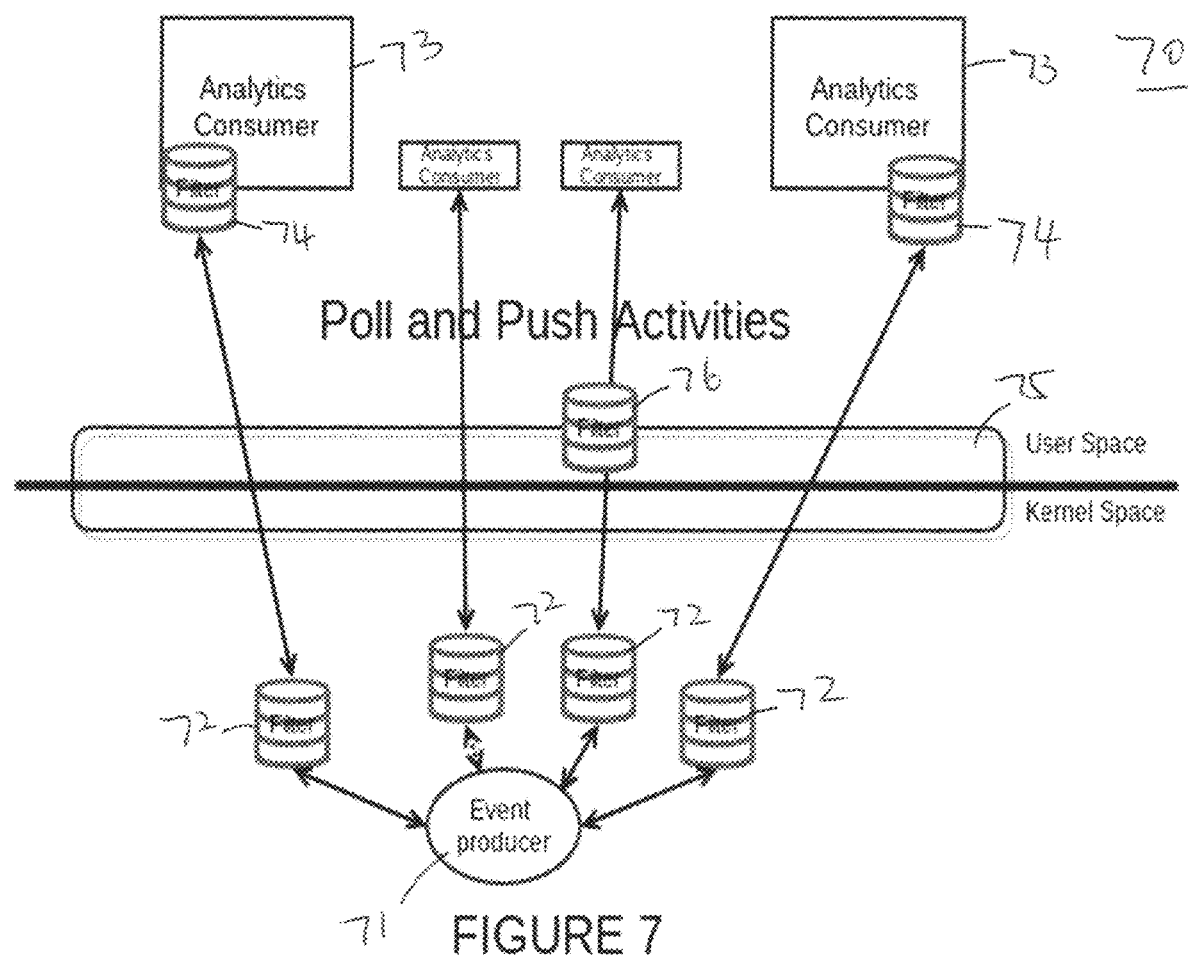
FIG. 7 is a block diagram illustrating a resource level interface, according to an embodiment of the present disclosure.

FIG. 7 illustrates an exemplary resource level programmatic interface 70. As shown in FIG. 7, resource level programmatic interface 70 allows to place filters at both the analytics resource and at the consumer. Filters 72 may be placed at both the analytics source or event producer 71 and filters 74 may be placed at the analytics consumers 73. Filters 76 may be placed at the event broker 75. The event broker 75 may be an example of system 30. Filters 73, 74 and 75 may use filter APIs of the relevant applications. Filter 74 is at the analytics application level. Filter 74 may be described by the YAML file in system 60. Multiple applications may use, for scaling of event handling, different filters for the same event so as to scale overall analytics collection.

One or more of the structured, lua, binary filter APIs may be used at the resource level as well.

Filter Offloading

Often deployments of filters are limited by the fact that low level (resource) filtering is not able to fully apply the filters expressed by a system. In an example of Linux, the classical BPF is not able to deal well with optionally appearing fields. In other cases it is due to limitations in hardware capabilities in what filter attributes can be expressed at the resource level. For example, there may be memory space restrictions such that storing more of the filter expression implies consuming more of the limited hardware resources. Such a scenario occurs in TCAMs. As well, sometimes, it is desired to offload part(s) of the filter expression with the goal of achieving maximum performance.

Interface 70 or the filters in system 30 may use filter offloading which is a mechanism for splitting an expressed filter into multiple portions that can be inserted at different levels of a classification hierarchy. For example, partial filter may be achieved at the resource level 71 complemented by running the remainder of expression at the consumer level 73.

Although FIG. 7 illustrates an example of offloading split at a two levels of hierarchy, filter offloading is applicable to more than two levels of hierarchy, such as at a multiple hierarchy illustrated in FIG. 4. For example, the partial filters may be placed at the resource level, at FE application 46, at Fed 44, at CEd 42.

In some examples, the interface 70 may identify parts of a filter expression that can be offloaded, for example, by defining filter structures.

Figure 8:
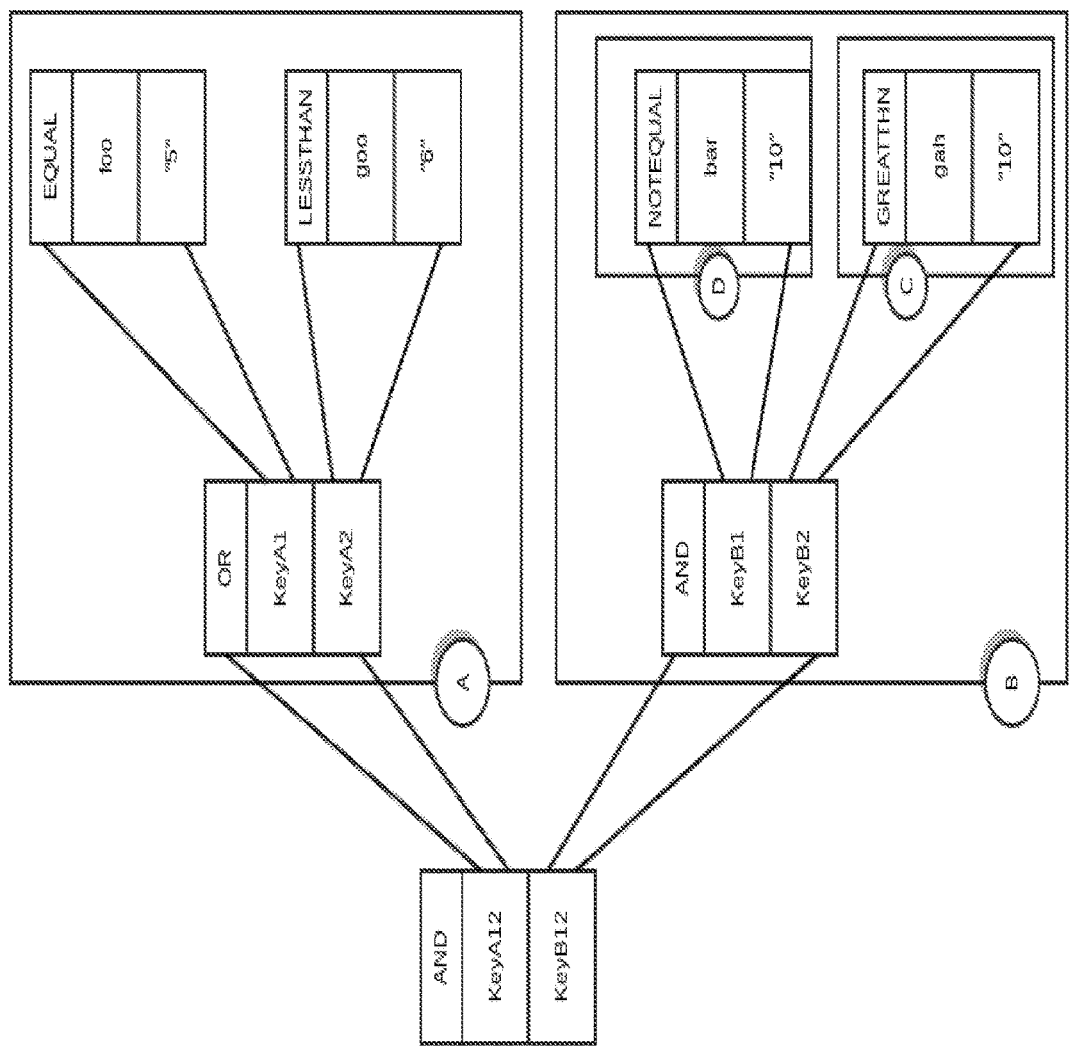
FIG. 8 is a block diagram illustrating a method of offloading partitioning, according to an embodiment of the present disclosure.

The filter expression (foo=5||goo<6) && (bar !=10 && gah>10) is used in the example of FIG. 8 to illustrate filter offloading. FIG. 8 shows the resulting filter tree of this filter expression. In an example that filters may be offloaded into the kernel using BPF in the example of FIG. 8. A sub-filter may work as part of a larger filter and is an offloadable partition when the sub-filter covers a superset of the full filter. In the example of FIG. 8, sub-filter blocks A, B, C and D in FIG. 8 meet this criteria and are offloadable partitions. The main restriction of filtering is the condition logical operations. A sub-filter that is offloadable needs to be in an AND relationship.

AND Logical Operation

In the example of FIG. 8, the logical A&&B relationship accepts less than A. In other words, A filters out more than its parent in the logical tree. This means that A by itself accepts more than A&&B does, therefore A is offloadable. The same applies to B.

OR Logical Operation

In contrast, within A, the expression "KeyA1||KeyA2" accepts more than just "KeyA1" or "KeyA2" does; this means that neither "KeyA1" nor "KeyA2" are offloadable NOT Logical Operation For the NOT logical operator, in the example of blocks E and F below. DeMorgan's theorem proclaims that:

```
1) !(E && F) = !E || !F
2) !(E || F) = !E && !F
```

For a filter in the operation of 1) above, namely, !(E&&F),

The top-level operation is unary and no part is offloadable on its own. Demorgans still may be used by crafting a more efficient short-circuit with the expression "!E||!F" than with the expression "!(E && F)".

For a filter in in the operation of 2) above, namely, !(E||F), the result of "!E && !F" means any of the !E or !F expressions are offloadable.

Optimizing Filter Offloading

There are times where, depending on filter offload technology available, it may be difficult to find the most effective offload. For example, in a BPF filter offload context, for an expression on a packet or events as:

```
(ethertype == ipv4) && (ip protocol == tcp) && (tcp dst port >=203) &&
(tcp dst port < 1020)
```

As described above, any expressions with filters using the logical && are offloadable.

From the parse hierarchy, it is clear that "ethertype=ipv4" is the most encompassing match and therefore the most effective to offload. If we have knowledge that ipv4 TCP packets are the only packets present, then offloading either "AND" of "tcp dst port<1020" or "tcp dst port>=203" will be more effective to offload.

It is not optimal if an offloadable expression is not the most effective to offload by virtue of always accepting being more of a burden to the consumer to filter even more. For example, if "ethertype=ipv4" is offloaded, the system 30 or 60 always getting IPv4 packets but a very high rate of UDP instead of TCP (when our interest is only in TCP).

System 30 may use per expression statistics which keep track of the number of hits on all the sub-filters for both offloaded portions and the non-offloaded portions. Periodically system 30 may collect the statistics and adjust what sub-filter is to be offloaded and, if necessary, proceed to replace the existing offloaded filter with a new one.

The filter offloading used in the system 30 and 60 may depend on the resource interfacing based on the offload features. The resource interfacing at the FE or FE local application will have the heuristics to decide what parts of a filter are broken down and what gets offloaded. System 30 and 60 may then use the APIs, such as MAL APIs, to set a flag to set a flag "offload on" or "offload off" and instruct the lower level interface to offload accordingly.

In an example, a hardware supports offloading of filters. For example the Intel Niantic 10G network card. The hardware may perform 2K "rules" which may match the IP addresses and identify whether a packet is TCP. In such a setup, the identification of "ethertype==IPv4 and protocol==TCP" to the hardware and the rest in software may be offloaded. The heuristic may observe that all packets are IPV4 and TCP then offloading the expression "tcp dst port<1020" may reduce the amount of packets sent to software Therefore the systems 30 and 60 are able to distribute the filtering in strategic hierarchies and thus help further reduce the cost of computation and IO hence helping scale the system. Fine-grained filtering of resource attributes in systems 30 and 60 helps horizontally scale the consumption of analytics. Systems 30 and 60 may scale better by moving filters closer to the source of the event. Systems 30 and 60 provide usable programmatic APIs capable of expressing filters in a human-intuitive way. This unburdens programmers and operators from worrying about cumbersome details of interfaces like BPF. Filtering interfaces of systems 30 and 60 work in the same semantics for both poll and push to improve usability. This approach should overcome the issues described earlier on Linux (BPF being only usable for events and per subsystem filtering being only usable for GET commands). In systems 30 and 60, adding new filtering attributes does not require infrastructure updates, i.e., no code changes are required for either the sensor or the consumer of events. This approach helps reduce maintenance costs.

Certain adaptations and modifications of the described embodiments can be made. Therefore, the above discussed embodiments are considered to be illustrative and not restrictive.

What is claimed is:

1. A system for scaling analytics collection from a plurality of distributed resources, comprising:
   a resource interface configured to acquire telemetry data generated from the plurality of distributed resources, the resource interface comprising a plurality of Control Element daemons (CEds) at one or more control elements (CEs), a plurality of Forwarding Element daemons (FEds) at one or more forwarding elements (FEs);
   a plurality of FE applications at the one or more FEs, the plurality of FE applications configured to receive first telemetry data from the telemetry data generated from the plurality of distributed resources,
   wherein each of the plurality of FEds is configured to receive second telemetry data selected from the first telemetry data received by the each of the plurality of FEds, and configured to select one or more CEds for receiving third telemetry data selected from the second telemetry data for forwarding to the one or more CEds, and
   wherein each of the plurality of CEds is configured to receive the third telemetry data from one or more of the plurality of FEds;
   one or more filters including at least one of the plurality of FE applications for scaling the first telemetry data, the plurality of FEds for scaling the second telemetry data, and the plurality of CEds for scaling the third telemetry data; and
   an analytics engine comprising one or more analytics applications for receiving the telemetry data through the plurality of CEds.

2. The system of claim 1, further comprising an application interface for transmitting the third telemetry data from the analytics engine to a telemetry consumer.

3. The system of claim 2, wherein the analytics engine is configured to add an event extension via an API at the telemetry data requesting the telemetry consumer to acknowledge receipt of telemetry data.

4. The system of claim 2, further comprising one or more filters placed at the telemetry consumer.

5. The system of claim 1, wherein the analytics engine is configured to use the Request-Response (RR) and Publish-Subscribe (PS) control APIs to conform the system to a ForCES Architecture.

6. The system of claim 1, wherein the resource interface includes at least one of a sensing module and an actuating module for collecting the first telemetry data from the plurality of distributed resources.

7. The system of claim 1, wherein at least two CE applications having a same group ID are subscribed to a CEd for receiving a same event.

8. The system of claim 1, wherein each of the plurality of FE applications is configured to listen to only a subset of the telemetry data generated by the plurality of distributed resources.

9. The system of claim 1, wherein the plurality of filters comprises one or more of structured Filter APIs, Lua Filter APIs, and Binary Filter APIs.

10. The system of claim 1, further comprising an API for discovering the resource and bridge between the resource and the consumer.

11. The system of claim 1, further comprising one or more filters placed at the plurality of distributed resources.

12. The system of claim 1, wherein the one or more filters uses filter offloading for splitting at least one of the plurality of filters into a plurality portions.

13. The system of claim 12, wherein the plurality portions are inserted at one or more of the plurality of distributed resources, FE applications, FEds, and CEds.

14. The system of claim 12, wherein the at least one of the plurality of filters has an AND logical operation.

15. The system of claim 1, wherein analytics engine is configured to transform the telemetry data from a ForCES format to a format to a format consumable by a Prometheus Push Gateway, by influxdb, forces, kafka or OAS.

16. The system of claim 1, further comprising a scheduling CE Application for collecting analytics, monitoring the plurality of FE applications, CEds and FEds and load-balancing.

17. The system of claim 1, wherein the one or more FEds transmits the third telemetry data the one or more CEds by broadcasting the third telemetry data to the one or more CEds, by sending the third telemetry data to a Master CEd of the one or more CEds or by sending the third telemetry data to a least loaded CEd of the one or more CEds, or by round robin the one or more CEds.

18. A method for scaling analytics collection from a plurality of distributed resources, comprising:
   receiving, by one or more forwarding element (FE) applications at a plurality of forwarding elements (FEs), first telemetry data from telemetry data generated from the plurality of distributed resources;
   receiving, by one or more Forwarding Element daemons (FEds) at the plurality of FEs, second telemetry data selected from the first telemetry data;

selecting, by the one or more FEds, one or more CEds for receiving third telemetry data selected from the second telemetry data for transmitting to the one or more CEds;

receiving, at the one or more CEds, the third telemetry data from the one or more FEds;

scaling, at one or more filters, at least one of the first telemetry data at the one or more FE applications, the second telemetry data at the one or more FEds, and the third telemetry data at the one or more CEds; and receiving, at one or more analytics applications, the third telemetry data from the one or more CEds.

19. The method of claim 18, further comprising scaling the telemetry data using one or more filters at the resource.

20. The method of claim 18, further comprising scaling the telemetry data using one or more filters placed at the telemetry consumer.

21. The method of claim 18, further comprising adding an event extension via an API at the telemetry data requesting a telemetry consumer to acknowledge receipt of telemetry data.

\* \* \* \* \*